United States Patent
Herzig et al.

(10) Patent No.: US 9,630,109 B2
(45) Date of Patent: Apr. 25, 2017

(54) CONTEXT-AWARE GAMIFICATION PLATFORM

(71) Applicants: Philipp Herzig, Dresden (DE); Michael Ameling, Dresden (DE)

(72) Inventors: Philipp Herzig, Dresden (DE); Michael Ameling, Dresden (DE)

(73) Assignee: SAP SE, Walldorf (DE)

( * ) Notice: Subject to any disclaimer, the term of this patent is extended or adjusted under 35 U.S.C. 154(b) by 240 days.

(21) Appl. No.: 14/276,679

(22) Filed: May 13, 2014

(65) Prior Publication Data

US 2015/0328550 A1    Nov. 19, 2015

(51) Int. Cl.
*A63F 9/00* (2006.01)
*A63F 13/60* (2014.01)
*A63F 13/30* (2014.01)

(52) U.S. Cl.
CPC ............. *A63F 13/60* (2014.09); *A63F 13/30* (2014.09)

(58) Field of Classification Search
None
See application file for complete search history.

(56) References Cited

U.S. PATENT DOCUMENTS

| | | |
|---|---|---|
| 2002/0147611 A1 | 10/2002 | Greene et al. |
| 2009/0138342 A1 | 5/2009 | Otto et al. |
| 2012/0270661 A1 | 10/2012 | Smith et al. |
| 2012/0331036 A1 | 12/2012 | Duan et al. |
| 2013/0232030 A1* | 9/2013 | Gockeler ............... H04L 67/22 705/26.8 |
| 2013/0262188 A1 | 10/2013 | Leibner et al. |
| 2013/0282421 A1* | 10/2013 | Graff ................. G06Q 10/1093 705/7.18 |
| 2013/0291065 A1 | 10/2013 | Jakowski et al. |
| 2013/0316311 A1* | 11/2013 | England ............... G09B 19/167 434/65 |

(Continued)

OTHER PUBLICATIONS

"R. H. Thomas, "A Majority Consensus Approach to Concurrency Control for Multiple Copy Databases," ACM Trans. Database Syst., vol. 4, No. 2, pp. 180-209, Jun. 1979. [Online]. Available:http://doi.acm.org/10.1145/320071.320076".

(Continued)

*Primary Examiner* — Seng H Lim
(74) *Attorney, Agent, or Firm* — Fountainhead Law Group P.C.

(57) ABSTRACT

An advanced context-aware platform is integrated with a variety of other applications to allow processing of contextual information from various sources. One type of application may provide spatial and temporal context information for various actions. Another type of application may provide additional information for an action within a social and/or business context. These contextual information types are received and assimilated by the platform in order to enrich the data value chain. Processing large volumes of data and events may be facilitated in a scalable and rapid manner utilizing technologies such as in-memory databases (e.g., the HANA database available from SAP AG), and/or complex event processing (CEP) such as is available from Sybase ESP. Context-aware platforms according to embodiments may find particular use in providing context to systems implementing gamification in an enterprise environment.

17 Claims, 16 Drawing Sheets

(56) References Cited

U.S. PATENT DOCUMENTS

| | | | |
|---|---|---|---|
| 2013/0324201 A1 | 12/2013 | Eberlein et al. | |
| 2013/0337909 A1* | 12/2013 | Pattison | A63F 13/00 463/29 |
| 2014/0051506 A1* | 2/2014 | Ameling | G06Q 99/00 463/29 |
| 2014/0108318 A1 | 4/2014 | Herzig et al. | |
| 2014/0156308 A1* | 6/2014 | Ohnemus | G06F 19/3418 705/3 |
| 2014/0322676 A1* | 10/2014 | Raman | G09B 19/167 434/65 |
| 2015/0141149 A1* | 5/2015 | Thomas | A63F 13/85 463/42 |
| 2016/0086121 A1 | 3/2016 | Heibrunn et al. | |

OTHER PUBLICATIONS

P. Herzig, M. Ameling and A. Schill, "A Generic Platform for Enterprise Gamification," in 10th Working IEEE/IFIP Conference on Software Architecture & 6th European Conference on Software Architecture, 2012.
A. Alves, "Extensions to Logic Programming Inference Engines to Support CEP," in RuleML '09, 2009.
Bunchball Inc., Available on http://www.bunchball.com/ (retrieved on May 9, 2012) and printed on Oct. 11, 2012.
Bigdoor Media, 2012. Available on http://www.bigdoor.com/how-it-works/ (retrieved on May 5, 2012) and printed on Oct. 11, 2012.
PunchTab. Available on http://www.punchtab.com (retrieved on May 9, 2012) and printed on Oct. 11, 2012.
Gigya, 2012. Available on http://www.gigya.com/gamification (retrieved on May 29, 2012) and printed on Oct. 11, 2012.
Actionable, 2012. Available on http://iactionable.com/ (retrieved on May 29, 2012) and printed on Oct. 11, 2012.
Open Badges. Available on http://openbadges.org/en-US/ (retrieved on May 29, 2012) and printed on Oct. 11, 2012.
Userinfuser. Available on http://code.google.com/p/userinfuser/ (retrieved on May 29, 2012) and printed on Oct. 11, 2012.
Badgeville, The Behavior Frameworks. Available on http://www.badgeville.com/how-we-help/behavior-frameworks/, printed on Oct. 11, 2012.
Matthias Strobbe, Olivier Van Laere, Femke Ongenae, Samuel Dauwe, Bart Dhoedt, Filip DeTurck, and Piet Demeester, and Kris Luyten, "Novel Applications Integrate Locations and Context Information," in Context-Aware Computing, IEEE CS, 1536-1268, 2012.
Dr. Alexander Schill, "Context-aware Applications and Location Based Services," Mobile Communication and Mobile Computing, Technische Universitat Dresden, Department of Computer Science. Nov. 2012.
Badgeville. Website, Mar. 2014. http://www.badgeville.com.
Bunchball. Website, Mar. 2014. http://www.bunchball.com.
J. Dormans. Engineering emergence: applied theory for game design. CC, 2012.
"P. Herzig, M. Ameling, B. Wolf, and A. Schill. Implementing Gamification: Requirements and Gamification Platforms. In Torsten Reiners and Lincoln Wood, editors, Gamification in Education and Business. Springer, 2014."
"J. Hamari, J. Koivisto, and H. Sarsa. Does Gamification Work. In a Literature Review of Empirical Studies on gamification. In proceedings of the 47th Hawaii InternationalConference on System Sciences, Hawaii, USA, 2014."

G. Rimon. Website, Apr. 2014. http://www.gamification.co/2013/07117/how-to-measure-the-roi-of-gamification/.
J. Boubeta-Puig, G. Ortiz, and I. Medina-Bulo, "An Approach of Early Disease Detection using CEP and SOA." In Third International Conferences on Advanced Service Computing, pp. 143-148, Jan. 2011.
S. Deterding, M. Sicart, L. Nacke, K. O'Hara, and D. Dixon, Chi. Gamification: Using Game Design Elements in Non-Gaming Contexts, Vancouver, BC, Canada, May 2011. ACM Press.
D. Flatla, C. Gutwin, L. Nacke, S. Bateman, and R. Mandryk, "Calibration Games: Making Calibration Tasks Enjoyable by Adding Motivating Game Elements." In UIST, Oct. 2011.
M. Geall, "Enterprise IT—Workers of the World Consume and Unite." Global Markets Research, pp. 1-84, Sep. 2011.
P. Herzig S. Strahringer, and M. Ameling, "Gamification of ERP Systems—Exploring Gamification Effects on User Acceptance Constructs." In Multikonferenz Wirtschaftsinformatik, pp. 793-804. GITO, Jan. 2012.
J. Hohwiller, D. Schlegel, G. Grieser, and Y. Hoekstra, "Integration of BPM and BRM." In R. Dijkam, J. Hofstetter, and J. Koehler, editors, Business Process Modeling and Notation, pp. 136-141, Berlin, Heidelberg, Jan. 2011. Springer.
M. E. Kharbili and T. Keil, "Bringing Agility to Business Process Management: Rules Deployment in an SOA." In Emerging Web Services Technology—vol. III, pp. 157-170, Basel, Boston, Berlin, 2009. Birkhauser Verlag.
C. Petty and H. Stevens, "Over 70 Percent of Global 2000 Organisations Will Have at Least One Gamified Application by 2014" retrieved from Internet: http://www.gartner.com/it/page.jsp?id+1844115. Nov. 2011.
J. Thom, D. R. Millen, and J. DiMicco, "Removing Gamification from an Enterprise SNS." In Proceedings CSCW, Feb. 2012.
Y. Xu, "Literature Review on Web Application Gamification and Analytics," CSDL Technical Report 11-05. Apr. 2012.
J. Yang, M. S. M S Ackerman, and L. A. Adamic, "Virtual Gifts and Guanxi: Supporting Social Exchange in a Chinese Online Community." In Proceedings CSCW, 2011, Mar. 2011. China.
D. Sottara, P. Mello, and M. Proctor, "A Configurable Rete-OO Engine for Reasoning with Different Types of Imperfect Information," IEEE Computer Society, IEEE Transactions on Knowledge and Data Engineering, vol. 22, No. 11, Nov. 2010.
D. Anicic, P. Fodor, S. Rudolph, R. Stuehmer, N. Stojanovic, and Rudi Studer, "A Rule-Based Language for Complex Event Processing and Reasoning," P. Hitzler and T. Lukasiewicz (Eds.) RR 2010, LNCS 6333, pp. 42-57, Springer-Verlag Berlin Heidelberg 2010.
D. Anicic, S. Rudolph, P. Fodor, N. Stojanovic, "Retractabale Complex Event Processing and Steam Reasoning," N. Bassiliades et al. (Eds.): Rule ML 2011, Europe, LNCS 6826, pp. 122-137, Springer-Verlag Berlin Heidelberg, Jan. 2011.
E. H. Calvillo-Gamez, P. Cairns, and A. L. Cox, "Assessing the Core Elements of the Gaming Experience," Chapter 4, R. Bernhaupt (ed.) Evaluating User Experience in Games, Human-Computer Interaction Series, Springer-Verlag London Limited 2010.
H. Obweger, J. Schiefer, M. Suntinger, and R. Thullner, "Entity-Based State Management for Complex Event Processing Applicaitons," N. Bassiliades et al. (Eds.): Rule ML 2011, Europe, LNCS 6826, pp. 154-169, Springer-Verlag Berlin Heidelberg, Jan. 2011.

* cited by examiner

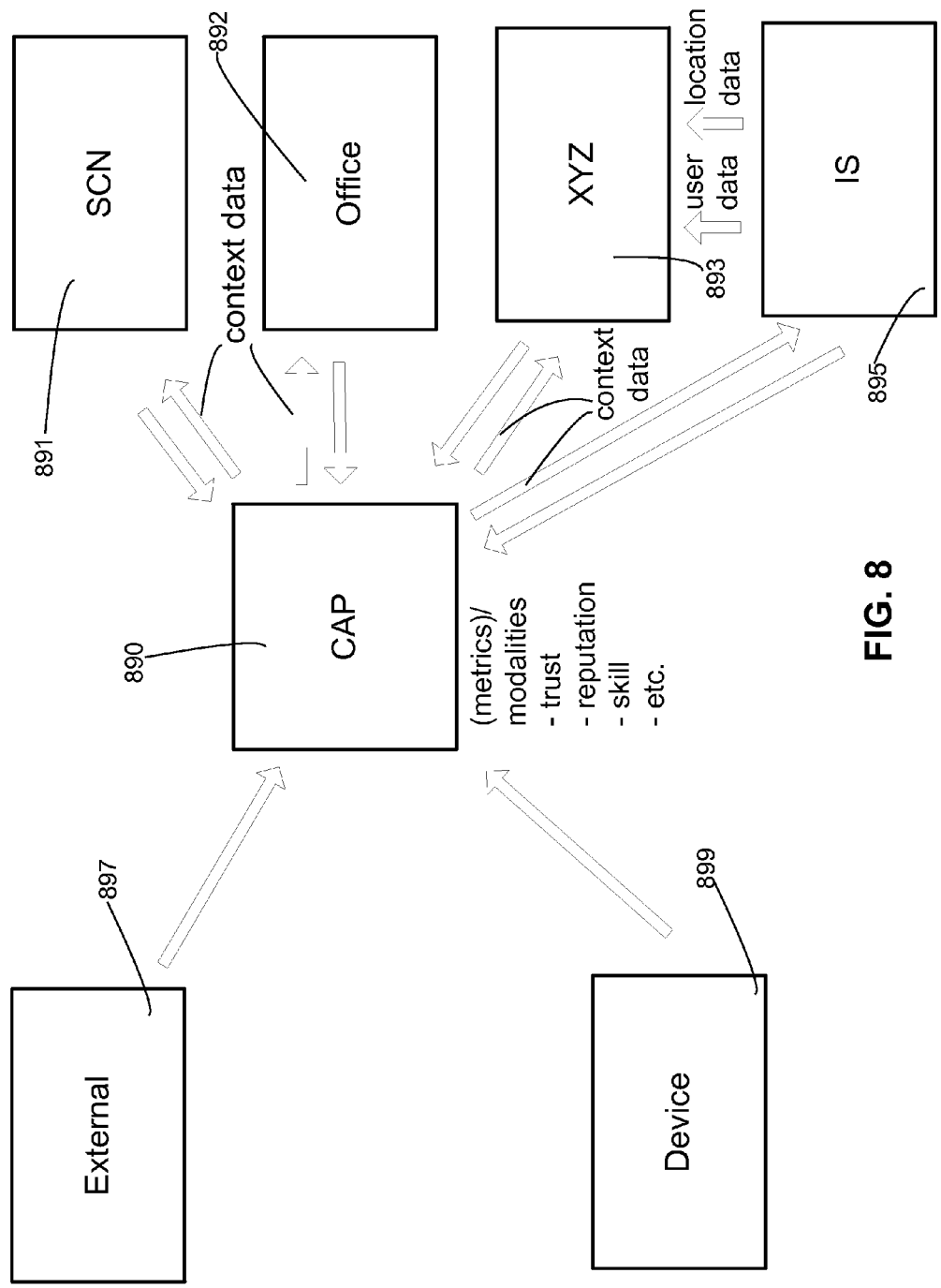

CONTEXT-AWARE GAMIFICATION PLATFORM

BACKGROUND

Unless otherwise indicated herein, the approaches described in this section are not prior art to the claims in this application and are not admitted to be prior art by inclusion in this section.

Gamification is an evolving technique by which game mechanics are applied to non-gaming applications in order to increase user engagement, motivation, and participation. This approach is especially promising in the enterprise domain since enterprise information systems (EIS) focus mainly on efficiency aspects rather than individual long-term motivation and enjoyment. Prior research has shown that these latter variables lead to higher positive organizational outcomes, e.g., job performance. Initial gamification attempts have been successfully implemented and show promise. However, existing gamification platforms are typically designed for business-to-consumer (B2C) purposes, require high integration effort, and lead to silo-based applications.

In addition, conventional gamification platforms may not consider the context from which data is extracted, or a particular destination of gamification data presented to the user or to other users. Therefore, known platforms may relate to processing game mechanics in only one particular context (e.g., a given enterprise application).

For example, a conventional gamification platform might be used by an enterprise application to calculate points, badges, or leaderboards. However, such a platform is not suited for use across multiple contexts and/or applications.

Thus conventional gamification platforms may not allow users to share their state across various applications and contexts. Moreover, conventional gamification platforms may not allow rules to be defined allowing transparent calculation of state across different platforms and connected information systems.

Also, conventional systems do not provide for explicitly deriving and calculating higher-level modalities. Furthermore, in order to calculate holistic modalities (e.g., trust, reputation), multiple gamification designs from across multiple contexts need to be consolidated.

Accordingly, there is a need in the art for advanced, context-aware approaches to gamification to calculate and present modalities based on gamification data to users and/or management.

SUMMARY

An advanced context-aware platform (CAP) is integrated with a variety of other applications in order to allow processing of contextual information. One type of application may provide spatial and temporal context information for various actions. Another type of application may provide additional information for an action within a social and/or business context. These contextual information types are received and assimilated by the platform in order to enrich the data value chain. Processing large volumes of data and events may be facilitated in a scalable and prompt manner utilizing technologies such as in-memory databases (e.g., the HANA database available from SAP AG), and/or complex event processing (CEP) such as is available from Sybase ESP. Context-aware platforms according to embodiments may find particular use in providing context to systems implementing gamification in the enterprise environment.

An embodiment of a computer-implemented method comprises causing a context engine to collect data from a first source comprising a gamification platform regarding an action taken in an enterprise, causing the context engine to collect context data from a second source, and causing the context engine to process the data and the context data to create context enriched data. The context engine is caused to store the context enriched data in a database, and the context engine is caused to provide the context enriched data in a view.

An embodiment of a non-transitory computer readable storage medium embodies a computer program for performing a method comprising causing a context engine to collect data from a first source comprising a gamification platform regarding an action taken in an enterprise, causing the context engine to collect context data from a second source, and causing the context engine to process the data and the context data to create context enriched data. The context engine is caused to store the context enriched data in a database. The context engine is caused to provide the context enriched data in a view.

An embodiment of a computer system comprises one or more processors and a software program executable on said computer system and configured to cause a context engine to collect data from a first source comprising a gamification platform regarding an action taken in an enterprise, cause the context engine to collect context data from a second source, and cause the context engine to process the data and the context data to create context enriched data. The context engine is caused to store the context enriched data in a database. The context engine is caused to provide the context enriched data in a view.

In certain embodiments the second source comprises an external system.

Some embodiments further comprise causing the context engine to send the context enriched data to the gamification platform.

In various embodiments the context data relates to an actor performing the action.

According to particular embodiments the second source comprises a social network, a business process, a tool, or a communication system.

In certain embodiments the context engine processes the data and the context data by filtering.

According to various embodiments the context engine processes the data and the context data according to a defined metric.

BRIEF DESCRIPTION OF THE DRAWINGS

FIG. 8 shows a simplified view of context-aware platform integrated with gamification platforms according to an embodiment.

DETAILED DESCRIPTION

Disclosed embodiments relate to context-aware platforms and methods to implement context-aware systems. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

An advanced context-aware platform is integrated with a variety of other applications to allow processing of contextual information. One type of application may provide spatial and temporal context information for various actions. Another type of application may provide additional information for an action within a social and/or business context. These contextual information types are received and assimilated by the platform in order to enrich the data value chain. Processing large volumes of data and events may be facilitated in a scalable and prompt manner utilizing technologies such as in-memory databases (e.g., the HANA database available from SAP AG), and/or complex event processing (CEP) such as is available from Sybase ESP. Context-aware platforms according to embodiments may find particular use in providing context to systems implementing gamification in the enterprise environment.

Figure 7:
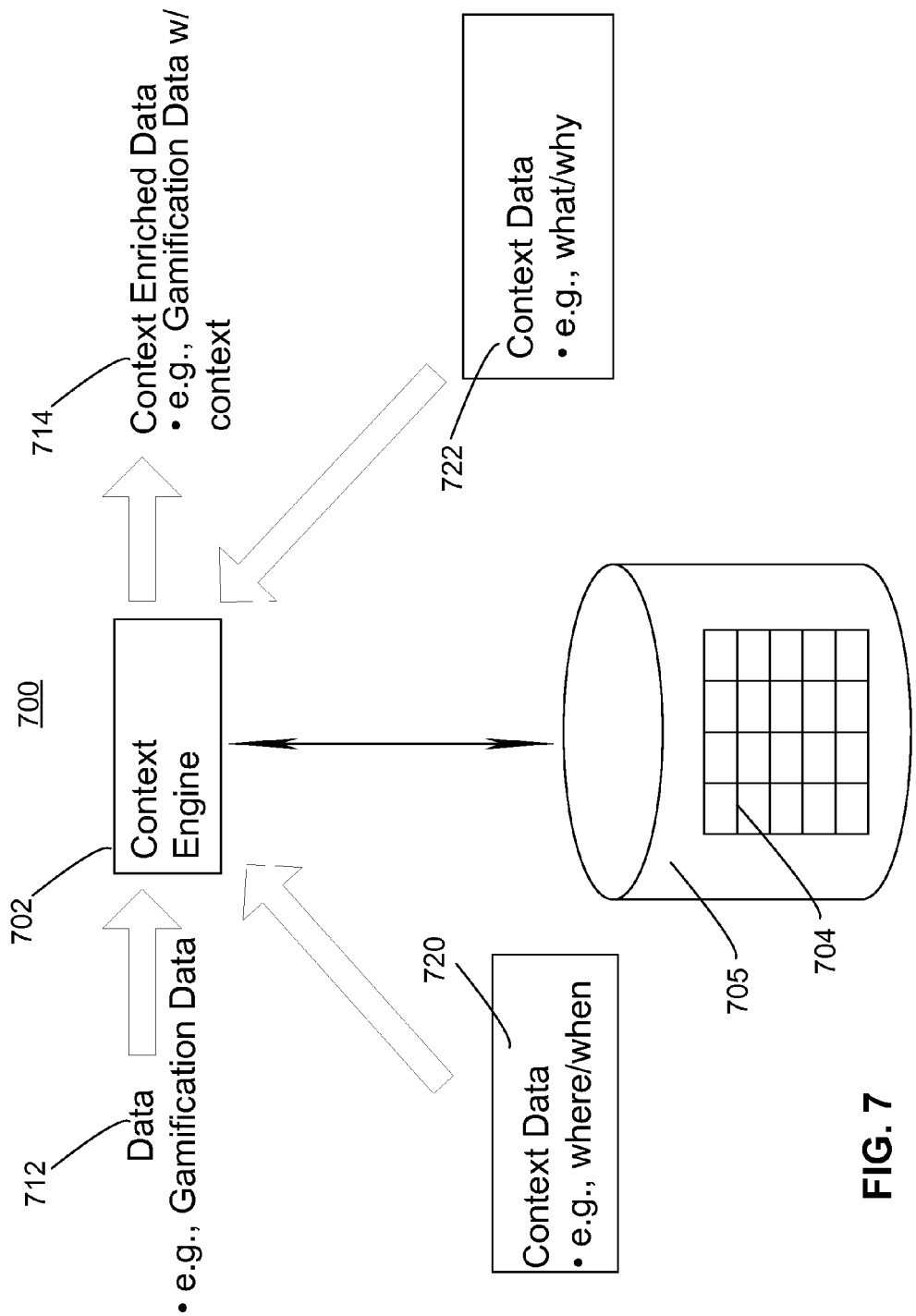
FIG. 7. shows a simplified view of an embodiment of a context-aware platform.

FIG. 7 is a simplified view of an advanced context-aware platform according to an embodiment. In particular, the platform 700 comprises a context engine 702 that is in communication with a database 704 of a computer-readable storage medium 705.

The context engine is configured to receive data 712 from one or more sources. In certain embodiments this data may comprise information regarding an action taking place in an enterprise environment. In some embodiments this data may comprise gamification data relating to that action that is provided by gamification platform(s), details of some embodiments of which are described below in connection with FIGS. 1-6. The context engine may be configured to store that data in a persistent manner, for example in the database or a filesystem.

In certain embodiments the database may comprise an in-memory database, for example the HANA database available from SAP AG. Other examples of in-memory databases can include but are not limited to the SYBASE IQ database also available from SAP AG; the Microsoft Embedded SQL for C (ESQL/C) database available from Microsoft Corp. of Redmond, Wash.; and the Exalytics In-Memory database available from Oracle Corp. of Redwood Shores, Calif. The database may alternatively comprise a disk-based database.

The context engine 702 may also be configured to receive context data from one or more sources 720, 722. As described in detail below, such sources of context data may comprise sensors, things, devices, or machines providing temporal and/or geographical information regarding the action itself or of an actor acting with the system(s) that are data sources 712 to the CAP or even other non-related systems. As is also described in detail below, other sources of context data may comprise social or business networks providing additional information regarding possible motivation or root cause for the action being taken.

The context engine 702 may perform processing of the data and the context data received, in order to produce context enriched data 714. In particular, the context engine may be configured to collect and store the context enriched data in the database. The context engine may also be configured to perform tasks such as filtering, aggregation, and/or correlation of data. Such filtering/aggregation may be performed at multiple stages, for example at the source, during the enrichment with additional context, or afterward. These techniques may be useful in the construction of views including the collected data, as well as context enriched data derived therefrom.

Figure 10A:
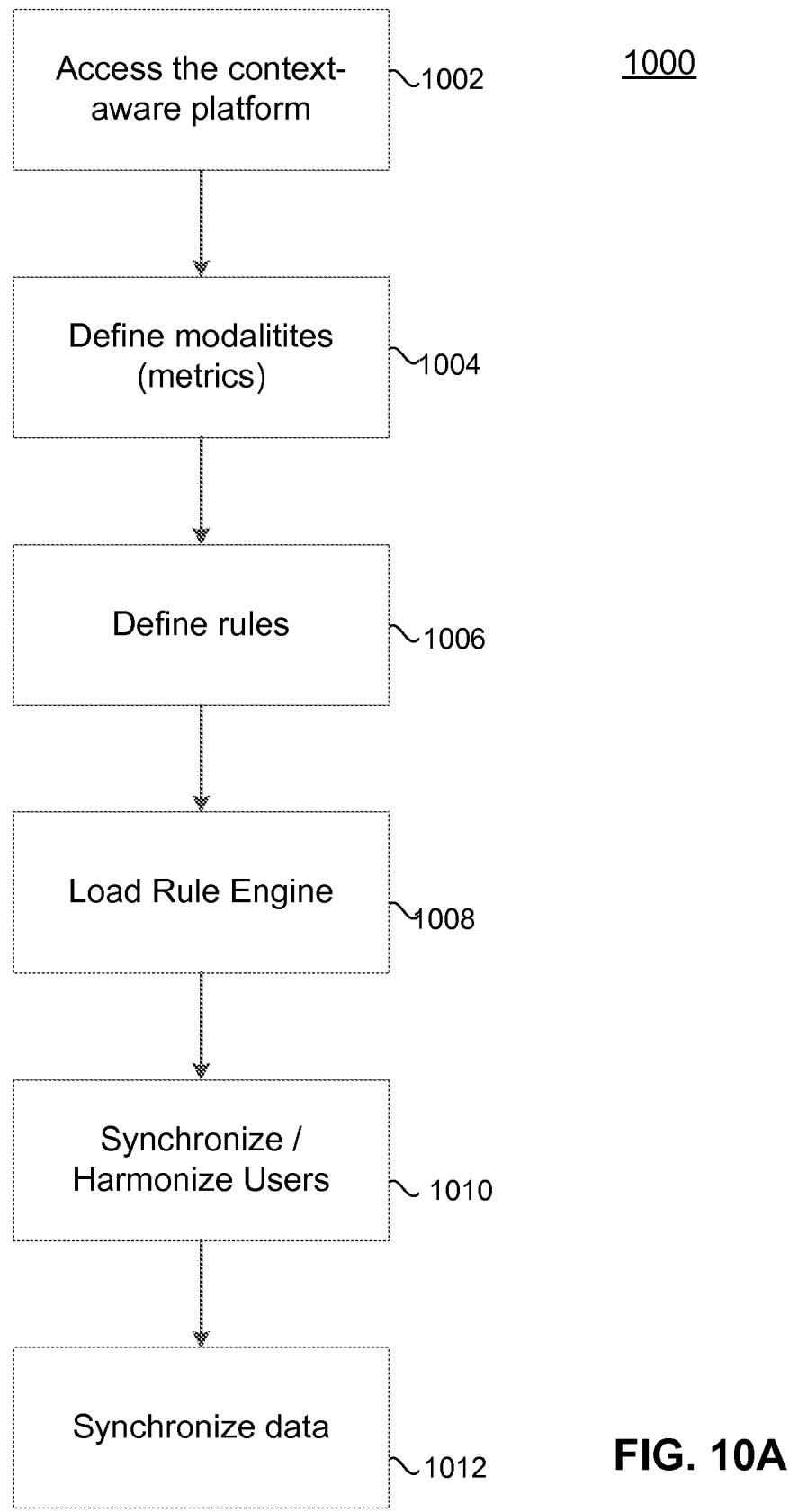
FIG. 10A is a simplified flow diagram of an embodiment of a method occurring at design time.
Figure 10B:
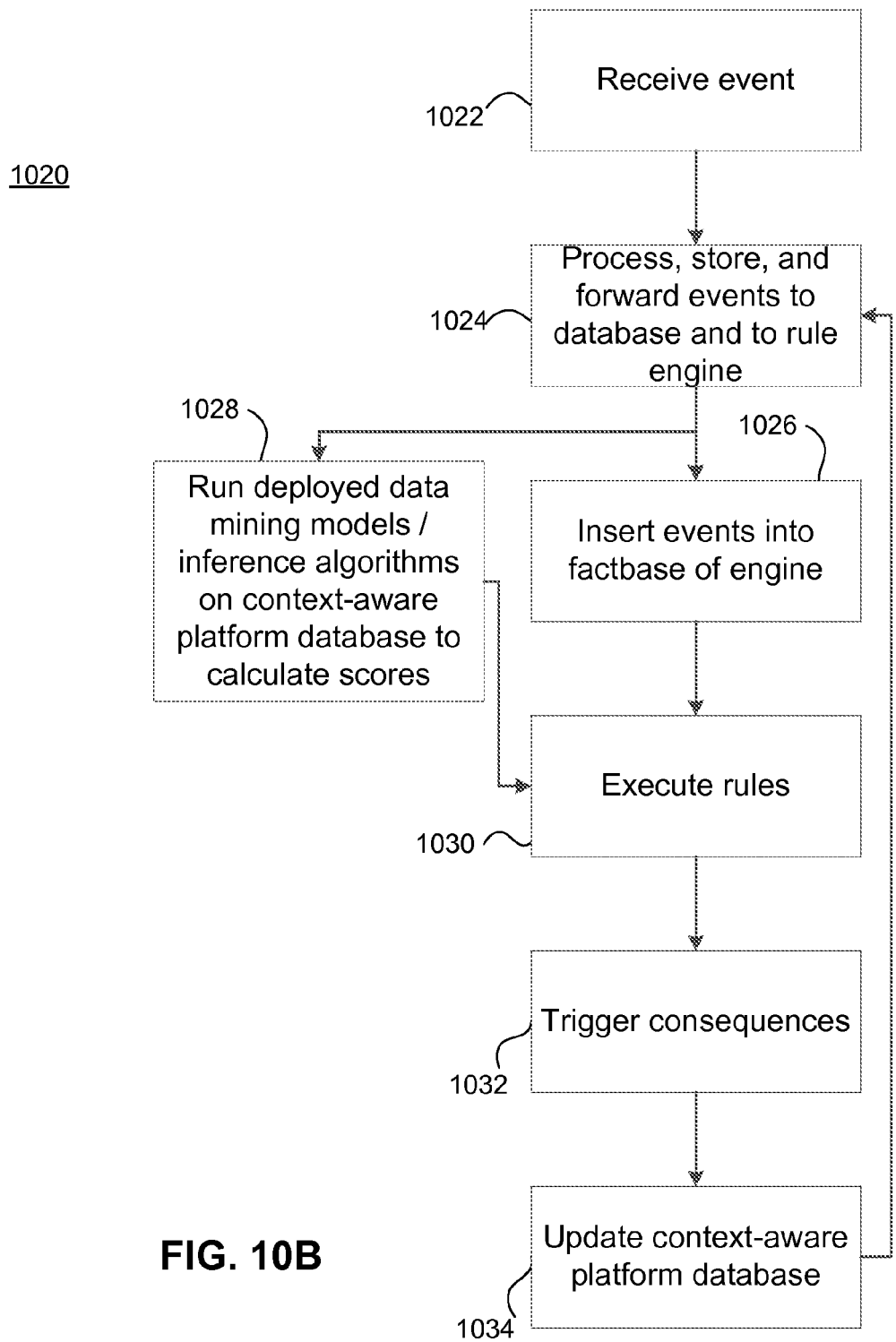
FIG. 10B is a simplified flow diagram of an embodiment of a method occurring at runtime.

The context engine may also be configured to define metrics and rules relating to the data. As discussed in detail below, such metrics and rules may find particular use in the application of gamification principles to actions taking place within an enterprise. FIGS. 10A-10B also discussed further below, provides a simplified flow chart illustrating steps that may be performed by an engine of a context-aware platform according to an embodiment.

FIG. 8 is a block diagram showing incorporation of a CAP 890 with a plurality of gamification platforms (GPs) 891, 892, 893, and also with external system(s) 897. Again, details regarding certain aspects of such gamification platforms are provided below in connection with FIGS. 1-6, and in particular interaction between a gamification platform and an associated IS system (e.g., gamification platform 893 and associated IS system 895).

In conventional approaches, the gamification platforms are isolated resulting in data silos. That is, there is no overall platform to judge what/how the points from a gamified application (e.g., XYZ) represent in context of another gamified application (for example an office application suite including word processing, spreadsheets, etc., e.g. Microsoft OFFICE, Open Office), for combinations of possible gamified applications within a single enterprise.

Furthermore, different metrics (via rules) may be applied to those different GPs. That is, the GP receives data available from the "gamified" application including user actions, spatial data from devices (if available), and external events from third party systems, etc. This can lead to difficulty in harmonizing/integrating different GPs with each other.

Accordingly, embodiments of the CAP as described herein may serve to federate/consolidate multiple gamification platforms across multiple domains. The CAP receives data created in the various GPs, which may include some form of context data.

It is noted that the CAP may receive data from sources other than GPs. For example, an information system (IS) is one specific type of an external system might be used as source as well. In particular embodiments, such an IS system may feature customized gamification feature(s), although this is not required for all embodiments.

It is noted that FIG. 8 shows that all gamification platforms (e.g., 891,892,893) are used to gamify respective information systems. However for purposes of simplifying the drawing, FIG. 8 visualizes this aspect only for the XYZ information system (i.e., 895 and 893), with the corresponding information systems for the other gamification platforms (e.g., 891-892) not shown.

Apart from the gamification data from the gamified information system, the information system itself may provide the original data to the CAP as well. One of the other information systems not shown in FIG. 8 (e.g., the respective IS lying behind gamification platform 892 or 891) may also be sending events to the CAP 890.

The CAP may receive low level events and/or raw data from source applications 899 serving as external systems as well. Examples include but are not limited to the SAP Community Network (SCN), MICROSOFT OFFICE, and device sensors. These are shown and described in detail in FIG. 8A below.

The CAP then processes the data (including context data) as shown in the runtime procedure process flow of FIG. 10B.

The CAP may calculate new metrics for modalities such as trust, reputation, influence, popularity, originality, proximity, influence, presence. As described in connection with FIG. 10A below, those may be defined at design time.

The metrics can be propagated back as events into the gamification platforms for the individual applications or the information systems. There, the modalities might be used to allow for improved gamification designs or enrich data with additional value.

As an example, a user may only receive a particular badge in one particular gamification platform after having an overall trust score of 95% percent, or the user earns additional moderation functionality in a forum after his reputation exceeds 95% in total. Another example would be that content created by users (e.g., a blog or taken images) would be rated with a high level of trust or originality based on the metric (trust, originality) calculated in the CAP.

The CAP may furthermore be used to derive views either for the users themselves, or for the managers of the gamified solutions. Multiple views may be possible on a context-aware platform. These views may be provided by an analytics element. This analytics element may comprise Business Objects Explorer available from SAP AG, or Lumira also available from SAP AG.

The content of such views may be limited based upon principles such as privacy (e.g., the view provided to one user may not include private data of another user).

For example, one view might be a gamification view (i.e., a view reflecting gamification aspects of context consumed by the application user.) A different view available from the context-aware platform might be a plain, location-based view.

CAPs according to embodiments thus allow consolidating gamification designs across various domains and applications. Furthermore, CAPs allow the definition of higher modalities such as trust, reputation, influence, or popularity, across various applications within the enterprise or a consumer space. Additionally, modalities and gamification results can enrich data/content from the original source (e.g. information system) with value, and may enrich representation, user interfaces, and/or interaction designs as well.

The architecture of the CAP and the GP can be relatively similar. However, each may support different concepts in the database. That is, the CAP and the GP may have different domain or meta-models deployed.

Figure 8A:
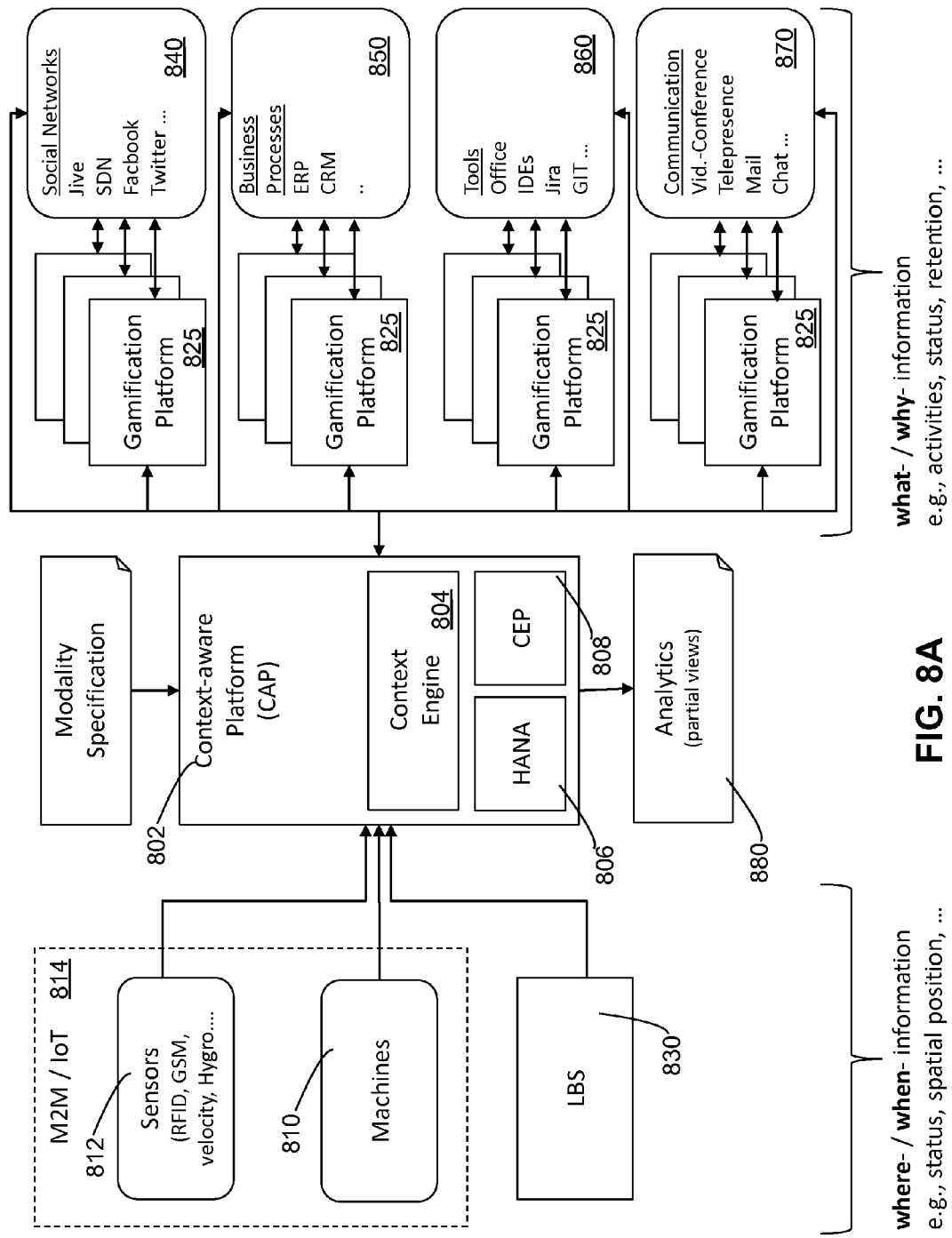
FIG. 8A shows a more detailed view of an embodiment of a context-aware platform incorporated with external systems according to an embodiment.

FIG. 8A is a block diagram showing incorporation of an advanced context-aware platform within an overall system 800. This FIG. 8A introduces the aspects of the context (e.g., when, what, where, why) to clarify how the context evolves.

In FIG. 8A the advanced context-aware platform 802 is depicted in the middle. Context-aware platform 802 may be executed in a hosted and managed environment. As previously described, the platform may include a context engine 804.

Context-aware platform 802 may be executed in a hosted and managed environment. As previously described, the platform may include a context engine 804.

The platform 802 may include other elements. One is a database 806, here shown as the HANA in-memory database available from SAP AG of Walldorf, Germany, although this is not required in all embodiments. Another element of the platform 802 is a rule engine (production rules) which may have additional complex event processing (CEP) capabilities (module 808).

The left-hand side of FIG. 8A shows certain examples of external systems of FIG. 8. One type of external system may comprise various machine sources 810 and sensors 812 of a machine-to machine (M2M) stack 814 that are integrated. These devices, for example, may comprise mobile devices determining a location of the user. Examples of sensors can include but are not limited to, Radio Frequency Identification (RFID) sensors, Global System for Mobile Communications (GSM) sensors, velocity sensors, WiFi sensors, velocity sensors, and others such as hygroscopic sensors.

In certain embodiments, these sensors/machines may be part of an Internet-of-Things (IoT). This term generally refers to "smart" devices having their own network connection in order to provide information regarding status and operability. Such devices can comprise, for example, smart phones or wearables.

One level higher, an external system in the form of a so-called location based services (LBS) 830 might be utilized on top of the rough sensor data. That is, applications may be integrated that contribute additional knowledge to the spatial context of the user.

As indicated in the FIG. 8A, the sensing functionality of the left-hand side of the diagram allows determining 'when' and 'where' aspects of context. Such information, however, may not provide knowledge regarding 'what' a user did, and/or 'why' such actions were taken.

Accordingly, the right-hand side of FIG. 8A shows the context-aware platform 802 integrated with some (nonlimiting) examples of other applications that may provide such what- or why-context data. In particular embodiments these applications may comprise gamification platforms 825.

As shown in FIG. 8A, certain of these gamification platforms may be integrated with various social applications and tools 840. Examples of such social networks can include but are not limited to JIVE, SDN, TWITTER, FACEBOOK, SDN, and others. FIG. 8A is just one embodiment, and others types of social applications and tools are possible.

Separately or in combination with such social and business applications, the context-aware platform may be integrated via a gamification platform with typical business applications realizing business processes 850 or parts thereof. Examples of such business applications can include but are not limited to Customer Relationship Management (CRM) software, and Enterprise Resource Planning (ERP) software.

Still other examples of external systems with which the platform may be integrated via a gamification system, include office or developer tools 860. Examples of such tools may include but are not limited to MICROSOFT OFFICE, IDEs, Jira, GIT, and others.

According to embodiments, advanced context-aware platforms may be integrated with communication systems 870. Examples of such communication systems can include but are not limited to video conferencing technology, telepresence technology, email, messenger applications, and others.

By the integration of various such sources of contextual information, user actions can be captured. For example, if the user received a badge or additional experience points, the CAP may calculate an increase in the trust of this user.

Furthermore, the trust metric might be not only calculated based on a single event from one individual application, but might be calculated based on events from multiple gamification platforms and their associated information systems. For example the CAP may have a rule deployed that increases the user's trust based on additional experience points received from one source (e.g., a first gamification platform, its associated information system, or both), and based upon badges received from a second source (e.g., a second different gamification platform, its associated information system, or both).

Moreover, the context-aware platform may receive the location where these users posted their comments. Such user events may be processed by context-aware platforms according to predefined rules.

As mentioned above in connection with FIG. 8, multiple views may be possible on a context-aware platform. These views may be provided by an analytics element 880.

Returning again to the left side of FIG. 8A, in conventional approaches an M2M stack focuses mainly on machine data and the respective communication. There, the scope is monitoring, analytics, and processing of M2M data in order to retrieve status and abnormal behavior (e.g., status of a machine to detect maintenance issues.) Often the cause of certain events cannot be determined, and additional information is necessary.

By contrast, certain embodiments may accordingly provide for integration of the platform with business processes, social networks, tools, communication tools, and other sources in order to help determine missing information. The context-aware platform allows the user to enrich the data value chain with additional context. This enrichment may be performed automatically, semi-automatically, or manually.

It is further noted that with conventional M2M approaches, context is basically generated from data provided by the device layer with data flow in a bottom-up manner.

Figure 9:
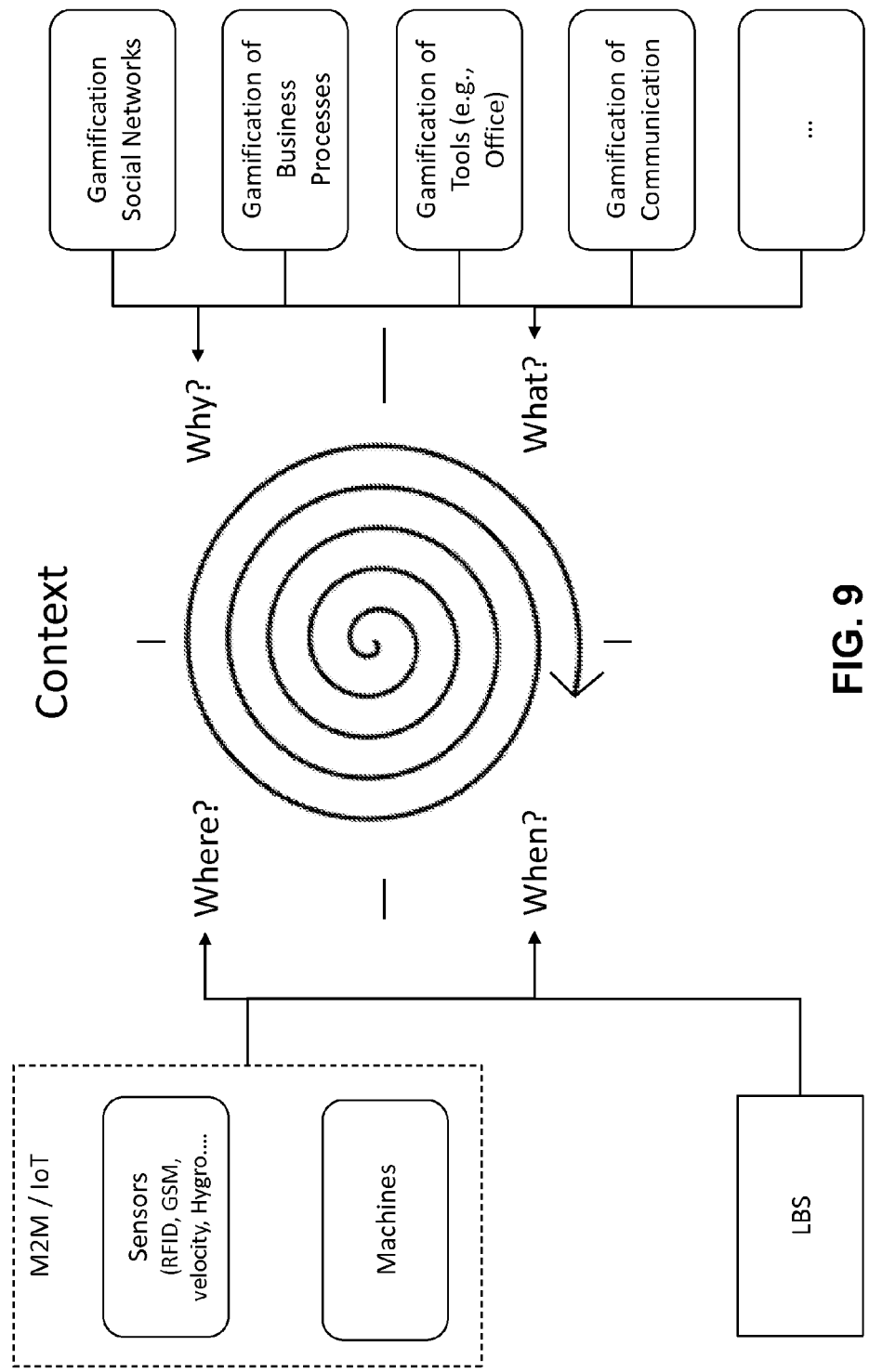
FIG. 9 shows a simplified view of a flow of information in a system according to an embodiment.

By contrast, an advanced context-aware platform according to embodiments could allow the flow of information in a variety of directions. This is depicted in FIG. 9, which shows a spiral of context.

There, context information is enriched with additional context on a continuing basis. Context information may come from the left- and/or right-hand side of the FIG. 9, in order to provide an ongoing update of context information.

FIG. 10A shows a simplified process flow for a design-time procedure 1000 for implementing a CAP according to an embodiment. This process flow may be compared with the design-time procedure for a GP as shown and described below in connection with FIG. 4.

A first step 1002 of the process flow is to access the context-aware platform. This may be done, for example, using the context-aware platform administration user interface (UI).

A second step 1004 of the process flow of FIG. 10A is to define modalities (metrics). This step determines which modalities are measured, which may include but are not limited to trust, reputation, influence, popularity, originality, proximity, influence, and presence. This step may include a selection of data mining algorithm to calculate these modalities based on existing algorithms (e.g., from social network analysis).

A next step 1006 is to define rules. This step may, for example, define the rules regarding how the final factors are calculated based on scores from data mining algorithms and gamification data.

A next step 1008 of the process flow of FIG. 10A is to load the context engine. That is, the defined rules are deployed into the context engine.

A next step 1010 is to synchronize/harmonize users. This step involves synchronizing and, optionally, harmonizing or consolidating the users from the different solutions (i.e., gamification platforms and information systems).

An optional final step 1012 is to synchronize data. Here, existing gamification or domain data is loaded into the context aware platform and, processing is commenced.

FIG. 10B shows a simplified process flow for a runtime procedure 1020 for implementing a CAP according to an embodiment. This process flow may be compared with the runtime procedure for a GP as shown and described below in connection with FIG. 5.

A first step 1022 is to receive an event. Such an event may be received either from a source information system (e.g., user event, spatial event, external event), or from the corresponding gamification platform (e.g., gamification events).

A second step 1024 is to process, store, and forward events to the database and to the context engine. Preconditions on incoming events (e.g., schema coherence, inconsistencies) may be checked.

A third step 1026 is to provide events to the fact base of the context engine. Specifically, validated events are stored into the rule engine of the context engine.

Alternatively, step 1028 calls for running deployed data mining models/inference algorithms on a context-aware platform database to calculate scores. New scores are calculated in the context-aware platform database based on deployed data mining models. Scores are forwarded and inserted as events into the rule engine of the context engine.

Step 1030 calls for executing deployed rules on the events, whether the result of the step 1026 or the step 1028. Step 1032 calls for triggering consequences based upon the execution of rules.

Step 1032 calls for updating the context-aware platform database. As shown by the feedback loop to step 1024, such updating of the context in the database may cause a reevaluation of the newly available knowledge.

Figure 11:
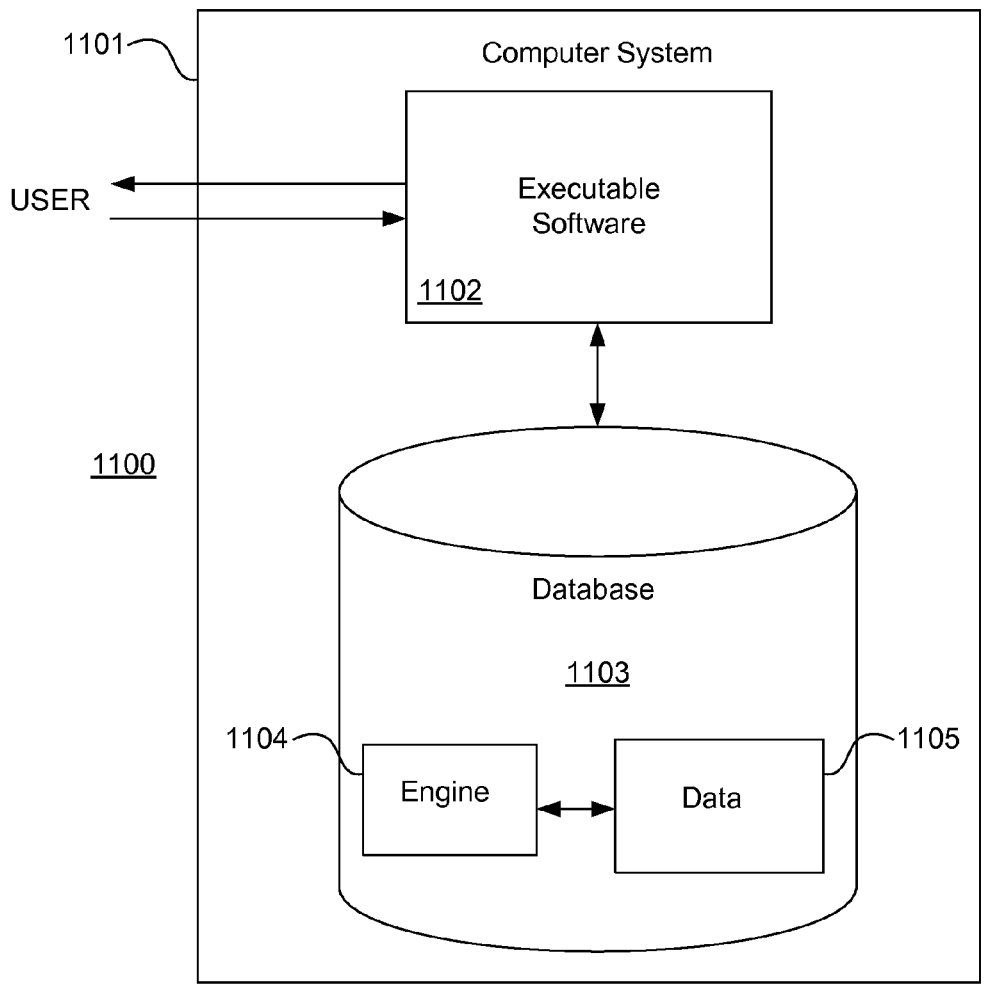
FIG. 11 illustrates hardware of a special purpose computing machine configured to provide a context-aware platform.

FIG. 11 illustrates hardware of a special purpose computing machine configured to implement a context-aware platform according to an embodiment. In particular, computer system 1100 comprises a processor 1102 that is in electronic communication with a non-transitory computer-readable storage medium 1103. This computer-readable storage medium has stored thereon code 1105 corresponding to context data. Code 1104 corresponds to a context engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 12:
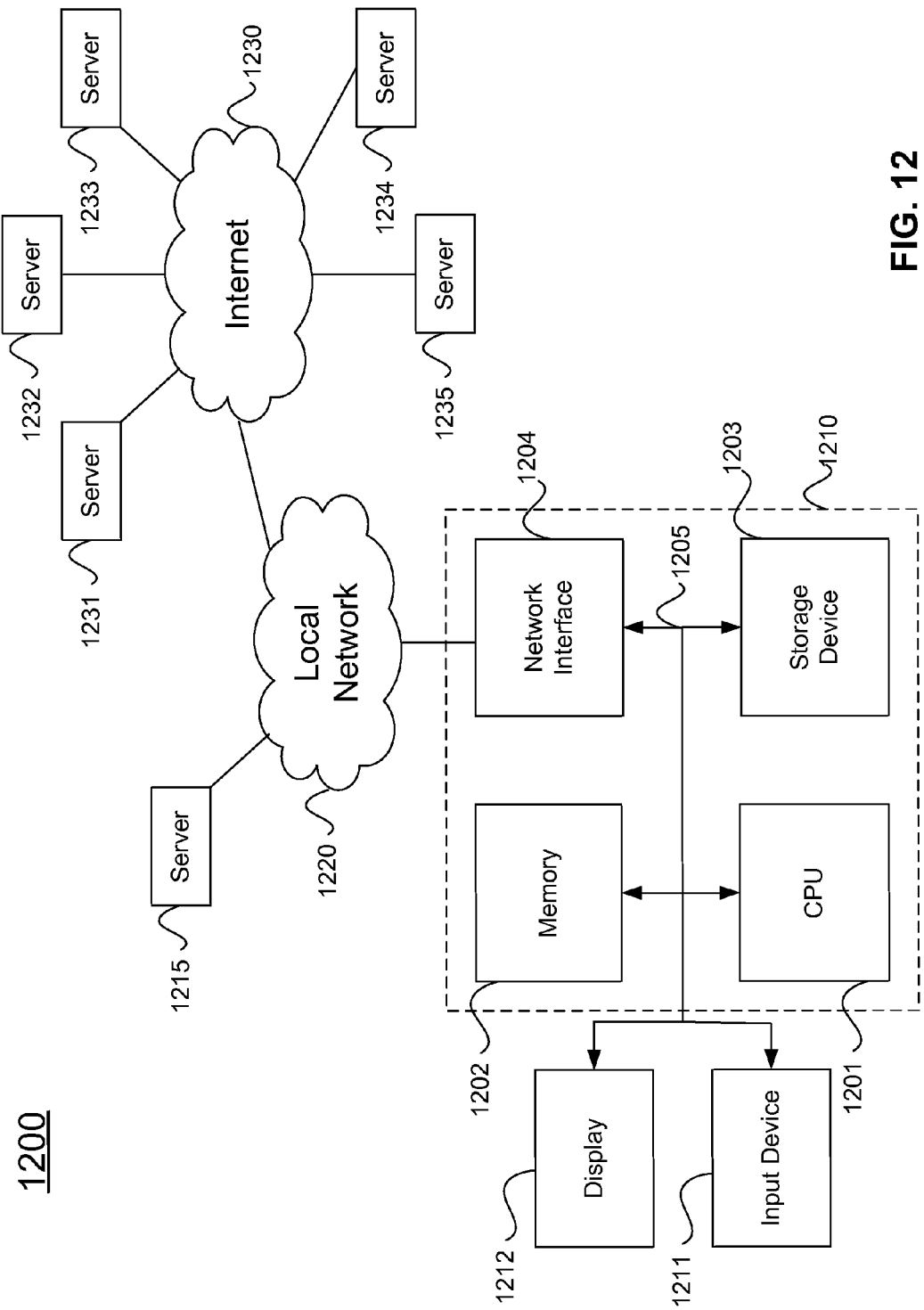
FIG. 12 illustrates an example of a computer system.

An example computer system 1210 is illustrated in FIG. 12. Computer system 1210 includes a bus 1205 or other communication mechanism for communicating information, and a processor 1201 coupled with bus 1205 for processing information. Computer system 1210 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques above, for example. Storage device and memory are both examples of computer readable mediums.

Computer system 1210 may be coupled via bus 1205 to a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1204 sends and receives electrical, electromagnetic, or optical signals that carry digital data streams representing various types of information.

Computer system 1210 can send and receive information, including messages or other interface actions, through the network interface 1204 across a local network 1220, an Intranet, or the Internet 1230. For a local network, computer system 1210 may communicate with a plurality of other computer machines, such as server 1215. Accordingly, computer system 1210 and server computer systems represented by server 1215 may form a cloud computing network, which may be programmed with processes described herein. In the Internet example, software components or services may reside on multiple different computer systems 1210 or servers 1231-1235 across the network. The processes described above may be implemented on one or more servers, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

Returning back to the particular view shown in FIG. 8, that figure depicts the context-aware platform as being in communication with a variety of external systems, one of which can be a gamification application. Certain details of such a gamification system are now described below in connection with FIGS. 1-6.

Specifically, a platform to gamify an enterprise includes a gamification platform and a message broker. Users in the enterprise may participate as players in the gamification platform. Enterprise information systems of the enterprise may communicate events to the message broker. Gamification rules may be expressed in terms of events and game context. The gamification platform may reason over events in accordance with the gamification rules and the current context of game play in order to trigger a proper consequence.

Figure 1:
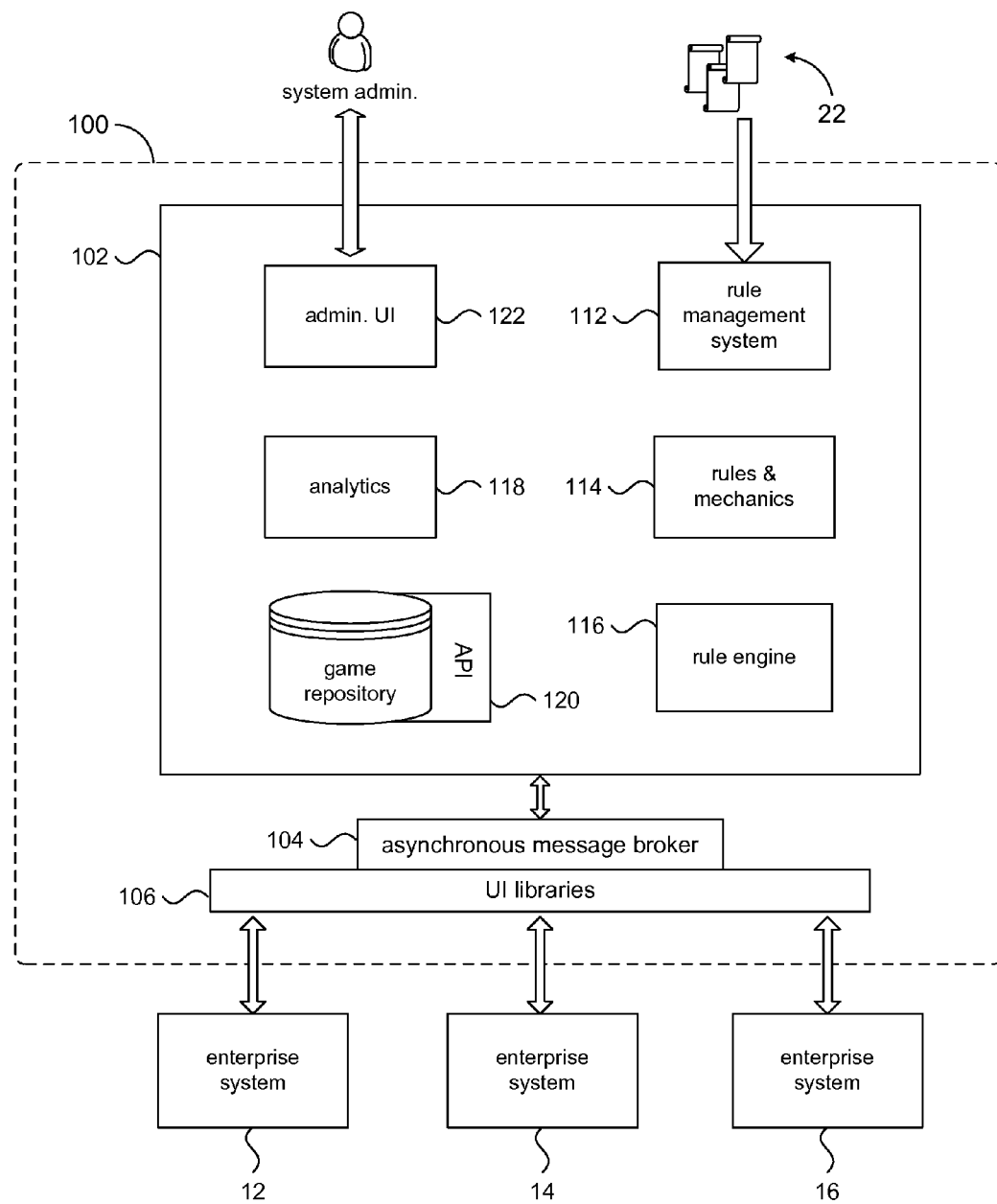
FIG. 1 shows an illustrative embodiment of a gamification system in accordance with the present disclosure.

FIG. 1 shows an illustrative example of a gamification system 100. The gamification system 100 comprises several components to gamify one or more enterprise information systems 12, 14, 16 deployed in an enterprise. In some embodiments, for example, the gamification system 100 comprises a gamification platform 102 and an asynchronous message broker 104. The message broker 104 may serve to connect the external and separate enterprise information systems 12-16 to the gamification platform 102 via a user interface (UI) framework 106.

The gamification platform 102 may comprise a rule management system (RMS) 112, a rules & mechanics component 114, a rule engine 116, an analytics component 118, and a gamification repository 120. As will be explained in more detail below, the RMS 112 may receive gamification rules 22 from a source external to the gamification system 100 and manage the gamification rules on behalf of the gamification platform 102. The RMS 112 may manage multiple sets of gamification rules 22 for separate different versions of gamification rules, administer incremental changes to the gamification rules, and so on. In some embodiments, different sets of gamification rules 22 may be provided to emphasize or test different motivational or behavioral designs. An example of gamification rules 22 is shown in the Appendix at the end the specification.

In accordance with principles of the present disclosure, "gamification rules" will be understood to incorporate aspects of an enterprise that govern the management and operations of the enterprise. For example, in addition to traditional notions of gaming rules, gamification rules 22 may include business rules and business processes which model and describe the behavior of the enterprise that is being gamified. Gamification rules 22 may incorporate policies and procedures (whether internally developed or externally imposed) that govern various operations in the enterprise. Gamification rules 22 may incorporate actual elements from the enterprise into the game such as physical facilities, locations, incentive programs, and so on. By incorporating aspects of the enterprise into the game this way, the gaming environment becomes a familiar landscape for players thus encouraging employees in the enterprise who may be reluctant to play or are uncomfortable with games to participate in the game.

The RMS 112 may deploy the gamification rules 22 into the rule engine 116. In some embodiments, the RMS 112 may inform the rule engine 116 which set of gamification rules 22 to use. In a particular embodiment, for example, a common shared location in a main memory or a common shared data storage location may be used to specify which gamification rules 22 are in play. Accordingly, if the RMS 112 receives new gamification rules or changes to existing gamification rules, the RMS may point the rule engine 116 to the new/changed gamification rules using the common shared data location. In some embodiments, the RMS 112 may manage gamification rules 22 that reside on one or more remote storage systems, separate from the gamification system 100. Accordingly, the RMS 112 may point the rule engine 116 to any remote systems that contain all or portions of the gamification rules 22.

The rules & mechanics component 114 may provide various game mechanics for supporting game play. Game mechanics may include tools for creating artifacts in the game and the accompanying logic for how to interact with the artifacts. The game mechanics may provide an infrastructure for rewarding players with award points (experience points, etc.), to mediate commerce (e.g., provide a marketplace, purchasing items, bartering between players, etc.), to communicate among players, and so on. The game mechanics infrastructure may allow for monitoring players in the game; for example, tracking player progress, announcing achievements (e.g., "player X is winner of the month"), providing a leader board, and so on. The game mechanics infrastructure may include functionality for monitoring events, such as timers to time events and player actions, location sensors to detect player movement and locations, sensors to track game conditions (e.g., a treasure chest is open), and so on.

In some embodiments, the rules & mechanics component 114 may support cooperative game play among players toward a common goal. The rules & mechanics component 114 may support competitive game play. Support may be provided for team formation where teams play toward a common goal or play against competing goals. The rules & mechanics component 114 may provide a communication platform for private communication among team members and communication between teams.

The analytics component 118 may analyze player behavior in order to improve the gamification rules 22 and optimize long-term engagement. The analytics component 118 may analyze historical data, for example, to compute player participation rates, player visit rates, and other such metrics. Player achievements, performance statistics, and other qualitative or quantitative game data may be computed. The analysis may be used to identify where the gamification rules 22 may be improved to enhance motivational elements in the game, increase player participation, and so on. The analytics component 118 may include data mining capability to conduct deeper analytics to identify trends, patterns, and so on as additional tools for improving the game design.

The gamification repository 120 may be a persistent data store for storing runtime aspects of the gaming platform 102. The gamification repository 120 may also store the game's environmental information such as maps, game items, game creatures, and so on. The gamification repository 120 may track players who are in the game, their IDs, alter ego information (e.g., game name, avatar, etc.), achievements, current gamification state, and the like. The gamification repository 120 may store gamification state information and player state information to allow the gaming platform 102 to operate in a stateful manner.

In some embodiments, the gamification repository 120 may provide an application programming interface (API) to provide computational access to the data stored in the gamification repository. For example, the gamification repository 120 may include a set of "query" APIs which may be used by other elements of the gamification platform 102 to perform complex computations of gamification state based on updates made to low level gaming data. For example, the rule engine 116 may request the sum of a player's accumulated points, which the rule engine may then use as an input when processing a rule. The rule engine 116 may request such a computation from the gamification repository 120, for example, each time that a player accumulates a point. If the gamification repository 120 responds with a result of "50", that may trigger the rule engine 116 to award the player with a "gold customer" badge.

The gamification repository 120 may include a set of "update" APIs to store progress events (discussed below) from the rule engine 116, thus updating the gamification state. In some embodiments, the update APIs may provide functionality to perform simple to complex consistency checking in order to ensure consistency of the data with respect to gamification semantics. For example, a "point" earned by a player is not just any point, but rather may be an experience point, a redeemable point (e.g., a form of currency), karma points, skill points, reputation points, and so on. Each kind of point has its own semantics. For example, a player's experience points should increment when the player makes an achievement (e.g., achieves the highest sales numbers for the month). The update APIs may check the data to ensure consistency of the data in the context of the gamification semantics before the data is persisted in the gamification repository 120.

The message broker 104 provides an interface between the external enterprise information systems 12-16 and the gamification platform 102. In accordance with principles of the present disclosure, the message broker 104 may operate asynchronously. More specifically, the message broker 104 may send messages to the enterprise information systems 12-16 independently of receiving messages from the enterprise information systems. Similarly, the message broker 104 may send messages to the gamification platform 102 independently of messages received from the gamification platform.

A UI framework 106 may be provided to connect players to the gamification system 100 for player interactions with the gamification platform 102. The UI framework 106 is an integrative aspect of the entire gamification platform 102. For example, basic functions such as communication with the message broker 104 and processing of message events from/to the gamification system 100 may be provided to support the seamless capturing of events without additional implementation effort. The UI framework 106 may provide basic gamification widgets such as turning the game on and off, automatic connection to the gamification platform 102, and so on. The UI framework 106 may allow players to define their own widgets, customize their avatars, and modify other player-related metadata. In some embodiments, a third party may develop widgets and avatars for distribution to players.

The UI framework 106 may be configured for integration into any given frontend or frontend technology, including different computing platforms and operating systems. In addition to providing seamless integration of the target platform (e.g., mobile device, computer tablet, etc.) with a gamification backend, the UI framework 106 may provide easy-to-use and customizable gamification widgets (e.g., profiles, leader boards, progress bars, etc.) for use on the target platform, including configuration and adaptation when the configuration and gamification rules may change.

In some embodiments, the UI framework 106 may notify players using push technology so that players can be notified without the player having to poll the gamification system 100. The UI framework 106 may be provided as a software development kit (SDK), for example for development on smart phones such as the iPhone® smart phone, an Android® brand smartphone, and the like. The UI framework 106 may comprise development systems for desktop computers, such as Adobe® Flash® Player, the Microsoft® Silverlight® development tool, the SAP® Web Dynpro™ modeling tool, and so on.

The gamification platform 102 may include an administrative user interface 122 to allow a system administrator to manage the gamification system 100. For example, players may be added or deleted from the system. The gaming environment may be managed. For example, elements that are relevant to the enterprise business and operations may be added to the gaming environment or otherwise managed; e.g., changing sales thresholds for winning points, adding new challenges and prizes, and so on. The administrator may manage the gamification rules 22; e.g., modify the gamification rules, install new versions, etc.

Figure 2A:
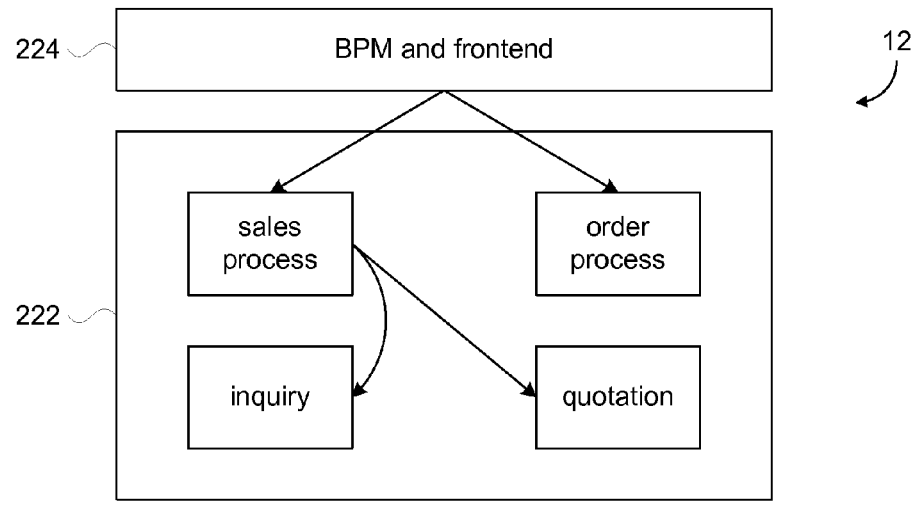
FIGS. 2A, 2B, and 2C illustrate typical enterprise architectures that may be integrated in the gamification system of the present disclosure.
Figure 2B:
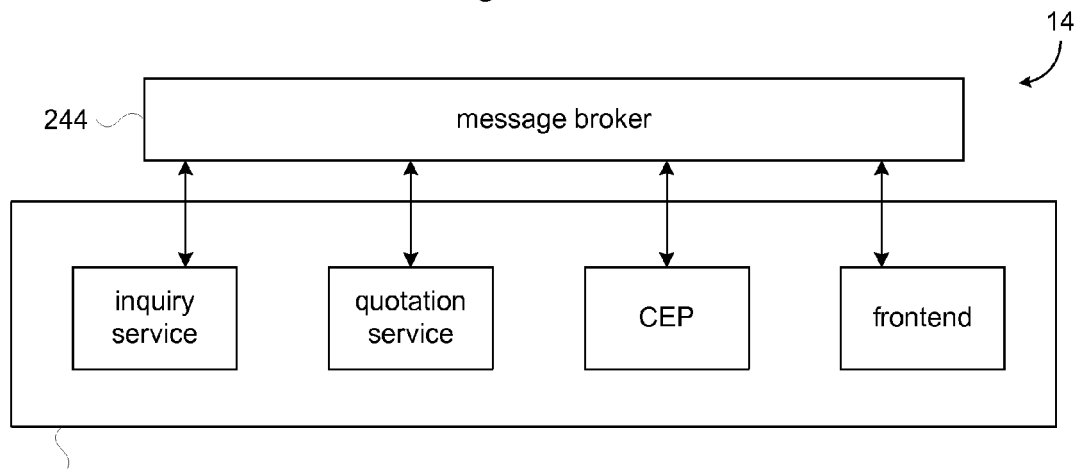
Figure 2C:
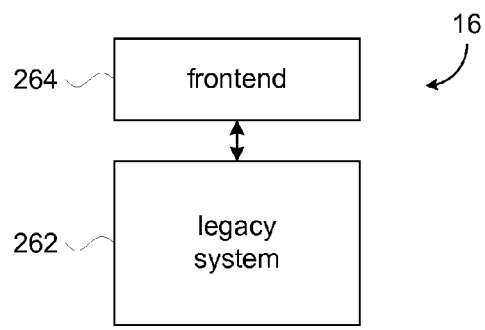

Referring now to FIGS. 2A-2C, a brief description of various enterprise information system architectures will be discussed. In accordance with principles of the present disclosure, gamification system 100 provides a generic platform to gamify enterprise information systems deployed in an enterprise. FIG. 2A illustrates an enterprise information system 12 that is based on an architecture generally referred to as a service oriented architecture (SOA). An SOA configured enterprise information system typically comprises a network of autonomous and interoperable processes and services. The SOA enterprise information system 12 illustrated in FIG. 2A, for example, comprises a configuration 222 of elements such as a sales process and an order process. The configuration 222 may include an inquiry service and a quotation service to support the sales process. The sales process may interact with the order process to complete the sales transaction. A module 224 may provide a business process management (BPM) model that orchestrates the interactions among the elements in the configuration 222. The module 224 may also include frontend elements to facilitate access to the processes in the configuration 222; e.g., a terminal UI, a mobile device, web-based services based on the simple object access protocol (SOAP), web services description language (WSDL), etc. for Internet access, and so on.

FIG. 2B illustrates an enterprise information system 14 that is based on an architecture generally referred to as an event driven architecture (EDA). An EDA configured enterprise information system typically comprises a configuration of elements that communicate by sending events. The EDA enterprise information system 14 illustrated in FIG. 2B, for example, comprises a configuration 242 of elements including an inquiry service, a quotation service, and frontend elements. The elements in configuration 242 act either as an event publisher (event sources) or an event listener (event sinks). A message broker 244 dispatches published events to all interested subscribing elements. Rules for dispatching events can be externalized via a complex event processor (CEP).

FIG. 2C represents a generic enterprise information system 16 that is not structured. Enterprise information system 16 may be a monolithic block of arbitrarily complex functionality 262. Such "legacy" systems, for example, may have been pieced together over time in an ad hoc fashion without a structured design to guide their evolution. A frontend module 264 may comprise user interface (UI) terminals, web services interfaces, and so on.

FIGS. 2A-2C represent a spectrum of enterprise information system architectures that can be deployed in gamification system 100. Some enterprise information systems may fall in one of these categories, but more likely, an enterprise information system may be some combination of them.

Figure 3:
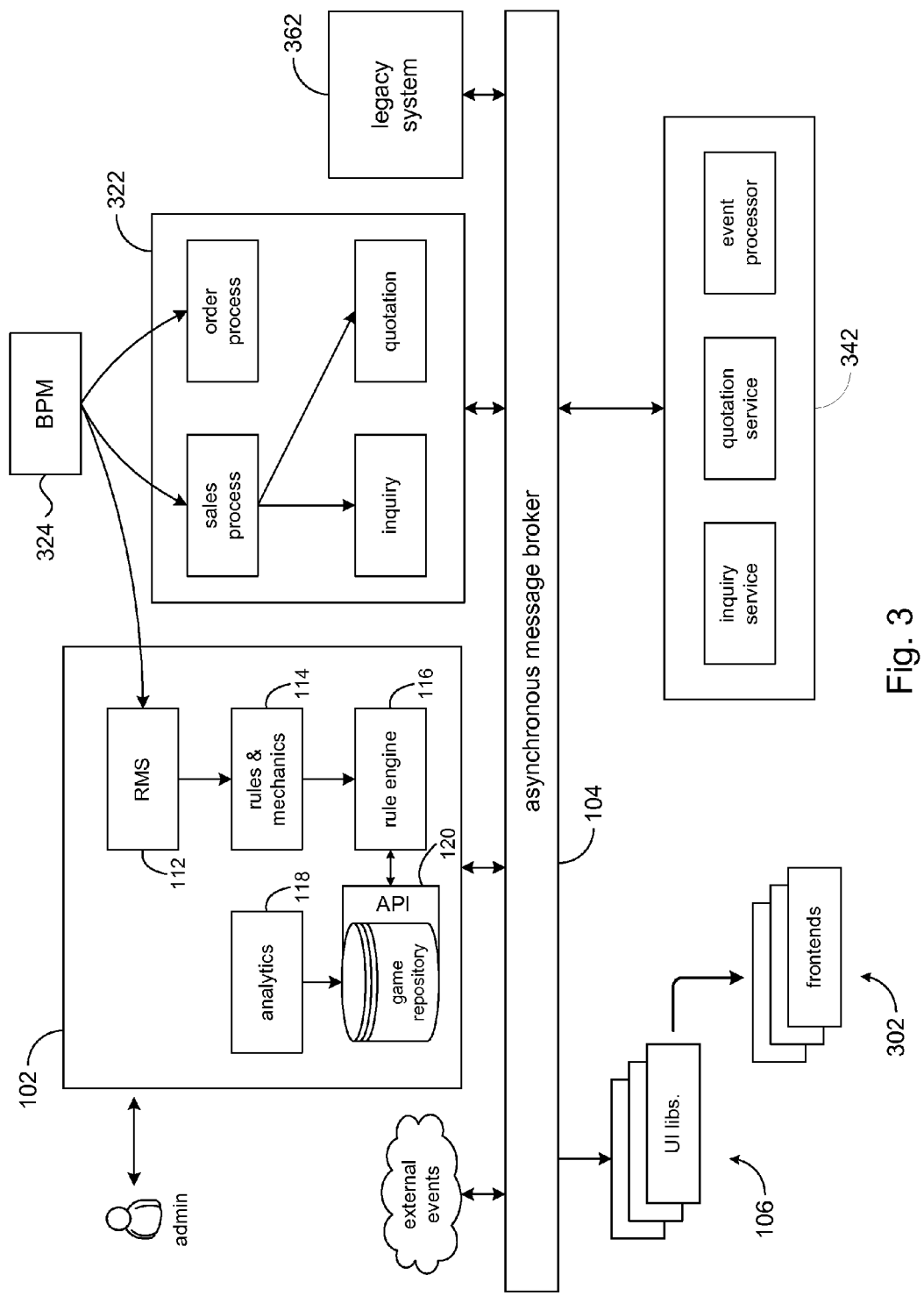
FIG. 3 illustrates an example of a gamification system integrated with enterprise information systems.

FIG. 3 depicts an illustrative embodiment of the integration of a gamification system with various architectures of enterprise information systems. The figure represents a generalized usage scenario where the gamification system is integrated in a hypothetical enterprise which has deployed an SOA architected enterprise information system 322, an EDA architected enterprise information system 342, and a generic enterprise information system 362. It will be appreciated, of course, that in other integration scenarios, the enterprise may deploy only one architecture, or the enterprise may deploy some combination of architectures.

In accordance with the present disclosure, everything that is relevant to game processing in the gamification platform 102 may be represented by events relating to the enterprise information system(s) 322, 342, 362. For example, if a user/player u in the enterprise successfully completes a step x in a process p, then an event e exists. The "user" may be a person, but may also be an abstraction representing a group of users, a department, machinery, etc. Following is a formal definition of events in accordance with some embodiments:

$$E = e_1, \ldots, e_n,$$

where E is the set of all enterprise events $e_i$. In accordance with the present disclosure, an event may occur within the enterprise; e.g., a sales person has reached a sales goal, manufacturing output has reached a certain limit, and so on. Events may occur outside of the enterprise, but are otherwise related to the enterprise; e.g., the number of customer complaints has exceeded some threshold, the delivery of parts for manufacturing is consistently late, and so on.

In some embodiments, an event $e_i$ may be defined as a 6-tuple:

$$\langle U, T_s, D, C, P \rangle,$$

where
    U is a set of user IDs representing one or more users involved in event $e_i$,
    $T_s$ is a timestamp representing the time of event $e_i$,
    D represents a duration of event $e_i$,
    C is a set of causal events associated with event $e_i$ where $C \subseteq E$, and
    P is a set of m additional parameters associated with event $e_i$ with $P = \{p_{i1}, \ldots, p_{im}\}$.

The causal events C constitute a set of already-occurred events that have given rise to event $e_i$, while the parameter set P further characterizes and describes the event $e_i$. The number m of parameters in P may vary from one event to another. The number n of events in E will increment by "1" with each occurrence of an event.

As explained above, the RMS 112 manages the gamification rules 22 for the gamification platform 102, and deploys or otherwise loads the gamification rules into rule engine 116 for processing. A set of gamification rules R may comprise n rules $r_i$, and may be formally represented by the following:

$$R = (r_1, \ldots, r_n).$$

Each rule $r_i$ may be formulated as an if-then condition:

$$r_i = p_i \Rightarrow c_i,$$

where $p_i$ is an $i^{th}$ premise for the $i^{th}$ rule and
$c_i$ is an $i^{th}$ consequence that is immediately executed (triggered) when premise $p_i$ evaluates to TRUE.

The premise $p_i$ may be an arbitrarily complex logical expression that, when evaluated to TRUE, triggers consequence $c_i$. In accordance with principles of the present disclosure, a premise $p_i$ may be represented by a set $C^i$ of m patterns:

$$C_{j:1\ldots m}{}^i,$$

which constitute the β-nodes of a generalized Rete graph. The $j^{th}$ pattern C of the $i^{th}$ premise $p^i$ may comprise some number n(j) of constraints:

$$\sigma_{k:0\ldots n(j)}{}^{i,j},$$

which define the α-nodes of the generalized Rete graph. Following are some examples of constraints:

$\sigma_1{}^{1,1}$=player.level=43

$\sigma_2{}^{1,1}$=player.age>50

$\sigma_1{}^{1,2}$=event.type="startedSale"

$\sigma_2{}^{1,2}$=event.duration=50 s $\sigma_1{}^{1,3}$=event.type="wentHomeYesterday"

$\sigma_2{}^{1,3}$=event.time>"23:00"

An LR(k) grammar allows arbitrary patterns $C^{i,j}$ of premise $p^i$ to be expressed using temporal and spatial Boolean logic; for example:

$C^{1,1}:=\sigma_1{}^{1,1}$ AND $\sigma_2{}^{1,1}$ OR $\sigma_3{}^{1,1}$, $C^{1,2}:=\sigma_1{}^{1,2}$ AND NOT $\sigma_2{}^{1,2}$, $C^{1,3}:=$NOT$(\sigma_1{}^{1,3}$ AND $\sigma_2{}^{1,2})$XOR $\sigma_3{}^{1,3}$ AFTER $[0,6]\sigma_2{}^{1,2}$.

As can be appreciated from the small sampling of examples above, the grammar may provide a full set of Boolean operators and comprehensive expressive capability to express logic of arbitrary complexity.

In accordance with principles of the present disclosure, the grammar allows for gamification rules 22 that can recognize and trigger a consequence based upon any kind of event and any pattern of events. The events may originate from the enterprise vis-à-vis the enterprise information systems 12-16 or from external sources. Events may be location specific (spatial) or time specific (temporal). Gamification rules 22 may be based on events that are defined based on where an action occurred (spatial events) or based on when an action occurred (temporal event). Patterns of events may relate to events that occur at different points in time. For example, a first event may set a trigger (e.g., a user purchase a public transportation pass such as a bus pass). However, the trigger may not result in a consequence (e.g., user is awarded a point) until a second event occurs, such as when the user actually uses the public transportation pass. Patterns of events may relate to events that are location specific. For example, a first event that occurs at location A may not result in a consequence until a second event occurs at location B.

In accordance with principles of the present disclosure, the grammar further allows for gamification rules 22 that can recognize and trigger a consequence based on patterns of events that are logically connected. Merely as an example, a gamification rule may recognize the occurrence of event A and event B, but not recognize only event A or only event B.

The logic may incorporate temporal relationships. For example, event A must be followed by event B within 10 days. The logic may incorporate a spatial relationship. For example, the gamification rule may recognize the occurrence of event A at location A and the occurrence of event B at location B as a precondition for triggering a consequence.

In accordance with principles of the present disclosure, the grammar further allows for gamification rules 22 expressed in terms of patterns of events which incorporate the current state (gamification state) or context of the game and/or the current state or context of a player or a group of players. For example, a gamification rule may recognize the occurrence of an event A, but only when a player is at a particular location or only when the player as 100 or more experience points. A gamification rule may recognize an event when all the players in a group have solved a puzzle, or when more than five players have reached a given sales quota, and so on. A gamification rule may use logical expressions to specify events in terms of time, space, and current gamification state of the game environment and players.

Continuing with FIG. 3, the message broker 104 may provide suitable APIs to facilitate integration with an enterprise information system. For example, the message broker 104 may provide message conversion routines to convert messages from the EDA architected enterprise information system 342 to a format that is suitable for the gamification platform 102. In the case of the SOA architected enterprise information system 322, the message broker 104 may provide message generating routines that allow a developer of the SOA architected enterprise information system to generate suitable messages that they can send to the gamification platform 102.

In the case of legacy system 362, a more full-featured API may be provided to accommodate enterprise information systems of arbitrary design. The legacy system 362 may be viewed as being one abstraction step higher than an EDA or SOA architected system because it is not likely that any assumptions can be made about its internal structure. For example, the legacy system 362 may not have adequate documentation, or may have no documentation. The customer who has a legacy system may be reluctant to allow inspection of the system software for fear of "breaking" the system, the system may not be easily probed, and so on. Nonetheless, in some embodiments, aspect oriented modules may be provided which are weaved into bytecode within a virtual machine which can capture events from the legacy system 362 without touching it.

In some embodiments, the enterprise information systems 322, 342, 362 may provide suitable frontends 302 with processing capabilities to interface with the message broker 104. For example, the frontend of an enterprise information system 322 may include a web services interface for each of the processes (sales process, order process, etc.) comprising the enterprise information system. The web services interface may send event messages into the message broker 104 as event occur. In other embodiments, the frontend 302 may be a mobile device that connects a player to the enterprise information system as well as the message broker 104.

As mentioned above, the UI framework 106 may connect players to the gamification system 100 for player interactions with the gamification platform 102. The UI framework 106 may comprise communication API's that the frontend 302 can use to communicate with the message broker 104 so that the player may receive events from the gamification system 100 and, conversely, so that the player can issue gamification relevant actions into the gamification system; e.g., the player has clicked on button X, marked a text as bold, accessed the solution after 10 pm for the third time, and so on.

In accordance with the present disclosure, the API provided by the message broker 104 may include other supporting functionality. For example, the API may provide data model transformation and data format transformation, in addition to the protocol transformations described above. Other functionality may include anonymizing certain sensitive data, filtering personal data, mediation with services provided by the enterprise information system, providing security measures, controlling the distribution of event messages, and so on. The message broker 104 may incorporate best practices policies, human resource policies, and other relevant governing policies of the enterprise into its logic to properly handle event messages.

As shown in FIG. 3, in some embodiments, arbitrary external events may be captured by the message broker 104 and provided to the gamification platform 102. In the case of external events, however, APIs may be provided to allow external actors to capture the external events and communicate them to the message broker 104. For example, a source of an external event may be in a customer's system, a news portal, etc.

In addition to receiving event messages from the message broker 104, the gamification platform 102 may send "progress" event messages into the message broker. Processing of the gamification rules 22 by the rule engine 116 may trigger one or more such progress event messages. For example, if a player achieves some predefined goal (e.g., reaches a sales quota), the player may be rewarded with experience points, a badge, virtual currency, etc. The rule engine 116 may generate a progress event message to record such an event. More generally, the rule engine 116 may generate progress event messages to indicate any change in the gamification state as game play progresses. Progress event messages may be stored in the gamification repository 120 to update the gamification state.

Progress event messages may be sent to one or more frontends 302, for example, in order to inform one or more players of changes in the gamification state. In some embodiments, the UI on the receiving device (e.g., mobile device, computer tablet, etc.) may respond to progress event messages. For example, the UI may unlock additional buttons or functionality based on the level the player has achieved, and vice versa, if the player's skill has degraded in some way. Such feedback allows the UI to adjust its functionality in conjunction with the player's abilities and skills.

Although event messages sent from the message broker 104 to the frontends 302 are generally intended for players, in some embodiments event messages may be consumed by the enterprise information system itself. For example, the enterprise information system may receive event messages relating to a sales person's progress. If the enterprise information system receives an event that indicates the sales person has received some achievement badge within the game, the enterprise information system may assign an additional role to the sales person or unlock some capability in the backend system of the enterprise.

Figure 3A:
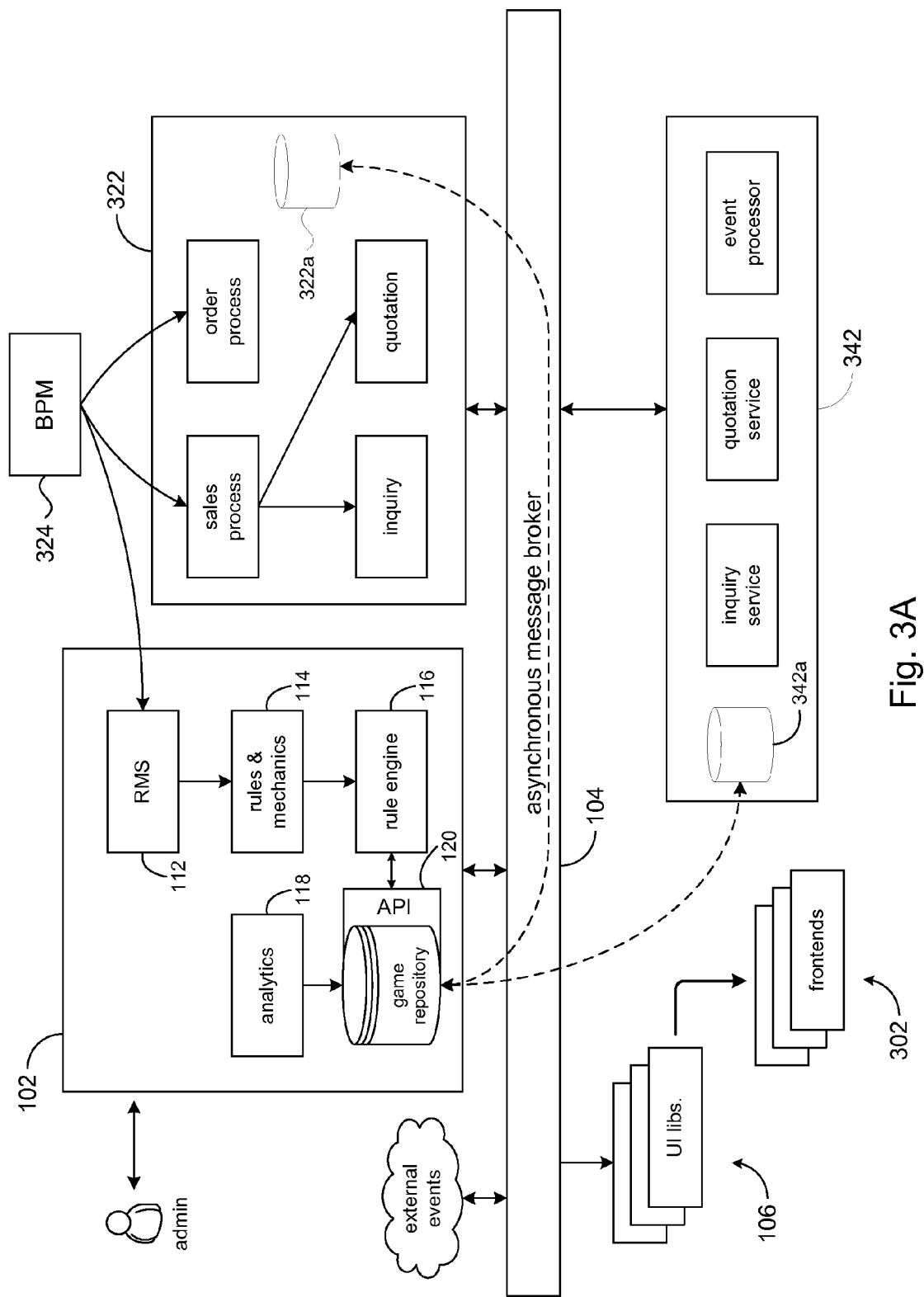
FIG. 3A illustrates an example of distributed gamification data.

As another example, in some embodiments, the enterprise information system may have already implemented, or is currently managing, a metric that is relevant to the gamification data. Rather than duplicating the metric in the gamification platform 102, the gamification repository 120 may be configured with information to access the metric from the enterprise system. An example of such a configuration is illustrated in FIG. 3A. Here, the enterprise information systems 322 and 324, each have respective data systems 322a and 324a. The figure represents a configuration where the gamification data may be distributed among data systems 322a and 324a, and the gamification repository 120. Accordingly, the gamification repository 120 may access gamification data stored in either data store 322a or 324a via the message broker 104. In an embodiment, for example, the gamification repository 120 may access data from and deposit data with the data stores 322a and 324a via event messages using the message broker 104.

Accordingly, in some embodiments, the gamification data may be distributed across multiple data systems in addition to (or perhaps instead of) the gamification repository 120. In order to maintain transparency within the gamification platform 102, the internal components of the gamification platform may always access gamification data via the gamification repository 120. If the gamification data is distributed, the gamification repository 120 would be responsible for managing data access among the multiple data storage systems.

Figure 4A:
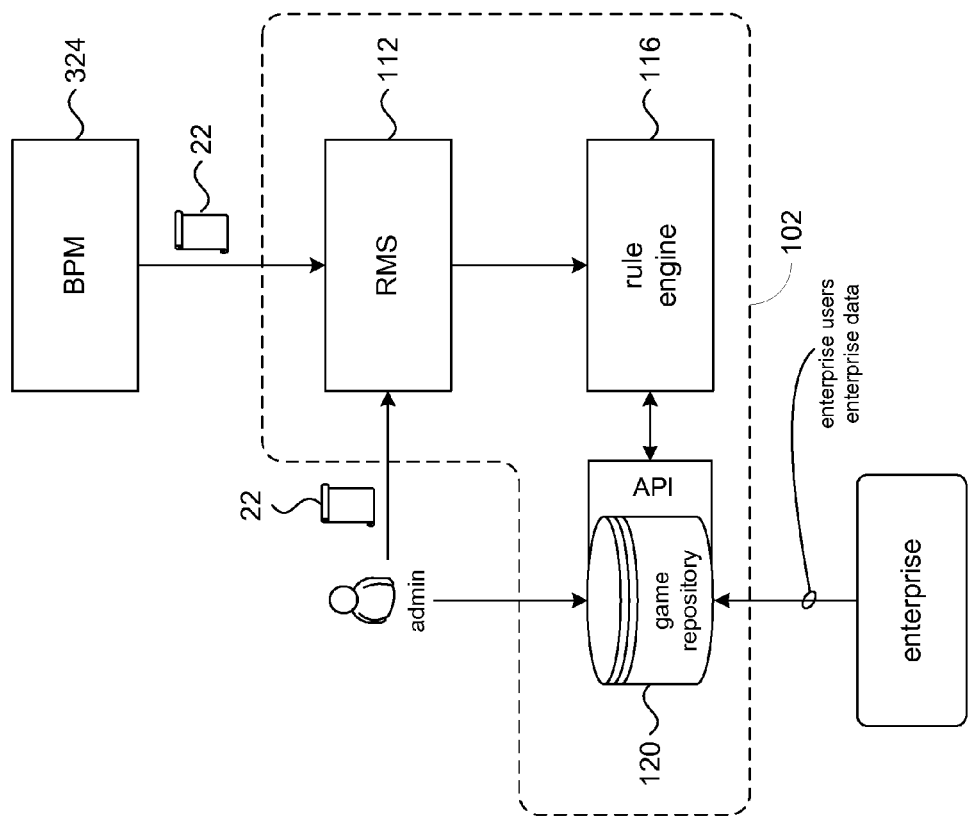
FIGS. 4 and 4A illustrate a design workflow in accordance with the present disclosure.
Figure 4:
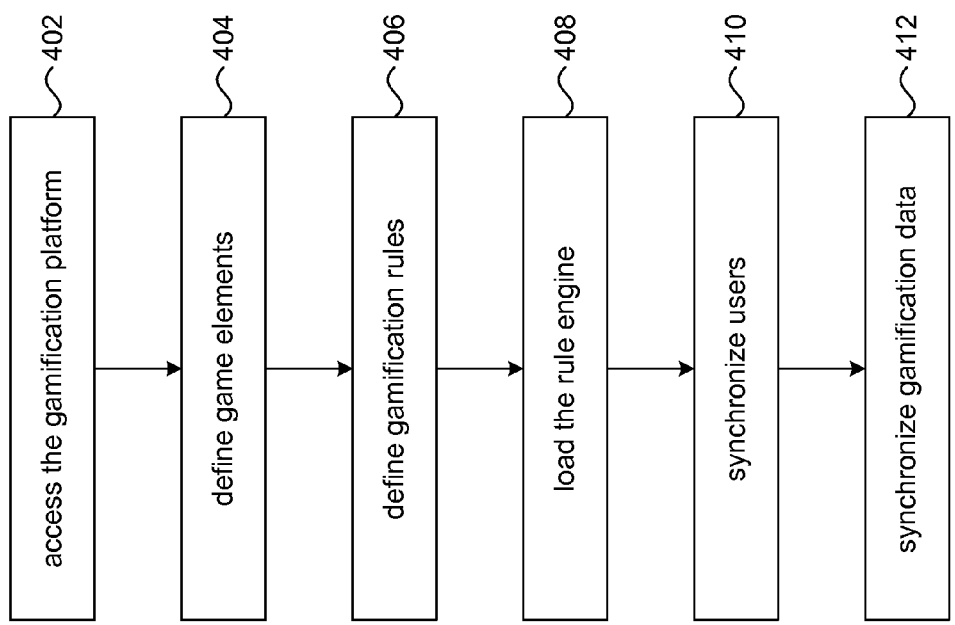

In some embodiments, the workflow for gamification system 100 includes a design time workflow and a runtime workflow. Referring to FIGS. 4 and 4A, an embodiment of a design time workflow will be described. In a step 402, an administrative user may gain access to the gaming platform 102. The administrative user may define, in step 404, various elements of the game. For example, the overall landscape of the gaming environment may be defined. The administrative user may define rewards to be offered. Player avatars may be designed, and so on. These elements may be stored in the gamification repository 120.

In a step 406, the administrative user may define the gamification rules 22, and provide the gamification rules to the RMS 112; e.g., in a rules file. In accordance with the present disclosure, the gamification rules 22 may be expressed in terms of events that may occur in the enterprise, or external events that are relevant to the enterprise; e.g., "when the player fulfills sales order X, the player gets 3 experience points." In some embodiments, the gamification rules 22 may be defined in accordance with the business project management (BPM) model 324 of the enterprise information system 322, and more generally, the gamification rules may be calculated from business processes of the enterprise. In some embodiments, the gamification rules 22 may be derived automatically from the BPM 324. Such integration of the enterprise's business model vis-à-vis the BPM into the gamification platform provides a high degree of flexibility and agility for the business user. As changes are made to the BPM, so too will changes be made to the gamification rules 22 to maintain close correspondence between gaming dynamics and the enterprise's business model and processes. The RMS 112 may load the gamification rules 22 into the rule engine 116 in step 408. In some embodiments, the rule engine 116 may poll the RMS 112 to learn whether there are any changes to the gamification rules 22.

In a step 410, users in the enterprise may be synchronized with the gamification system 102 as "players". In some embodiments, the administrative user may manually add users from the enterprise to the gamification platform 102; e.g., the gamification repository 120 may be used to store the players defined by an administrative user using the administrative UI 122. In some embodiments, users from the enterprise may be added to the gamification platform 102 via explicit gamification rules 22 for managing the addition and deletion of players. For example, the enterprise may send a "newUser" event message to the gamification platform 102. The event message may include all the metadata (e.g., user name, user's job title in the enterprise, their player name, initial settings, etc.) needed to register the user as a player in the gamification platform 102. A "deleteUser" event message may be defined to allow for a player to be deleted from the gamification platform 102. In other embodiments, players may be added in an ad hoc fashion if the enterprise information system cannot support a "newUser" event message. For example, the enterprise information system may simply send an event message that includes an unknown user ID. When such an event message is received, the user ID may be added to the gamification platform 102. Any additional data that may be needed for the added user may be obtained via an interaction between the gamification platform 102 and the user.

In a step 412, the administrative user may initiate a synchronization action to synchronize or otherwise import data from the enterprise information systems of the enterprise into the gamification platform 102. This step is optional and may be performed to initialize aspects of the gaming environment with metrics that are available from the enterprise. For example, carbon emission levels, allocated budget, and other pre-existing data from the enterprise may be relevant gamification data that can be stored in the gamification repository 120. This step may be performed any time that a new metric is developed in the enterprise information system that is deemed to be relevant gamification data.

Figure 5:
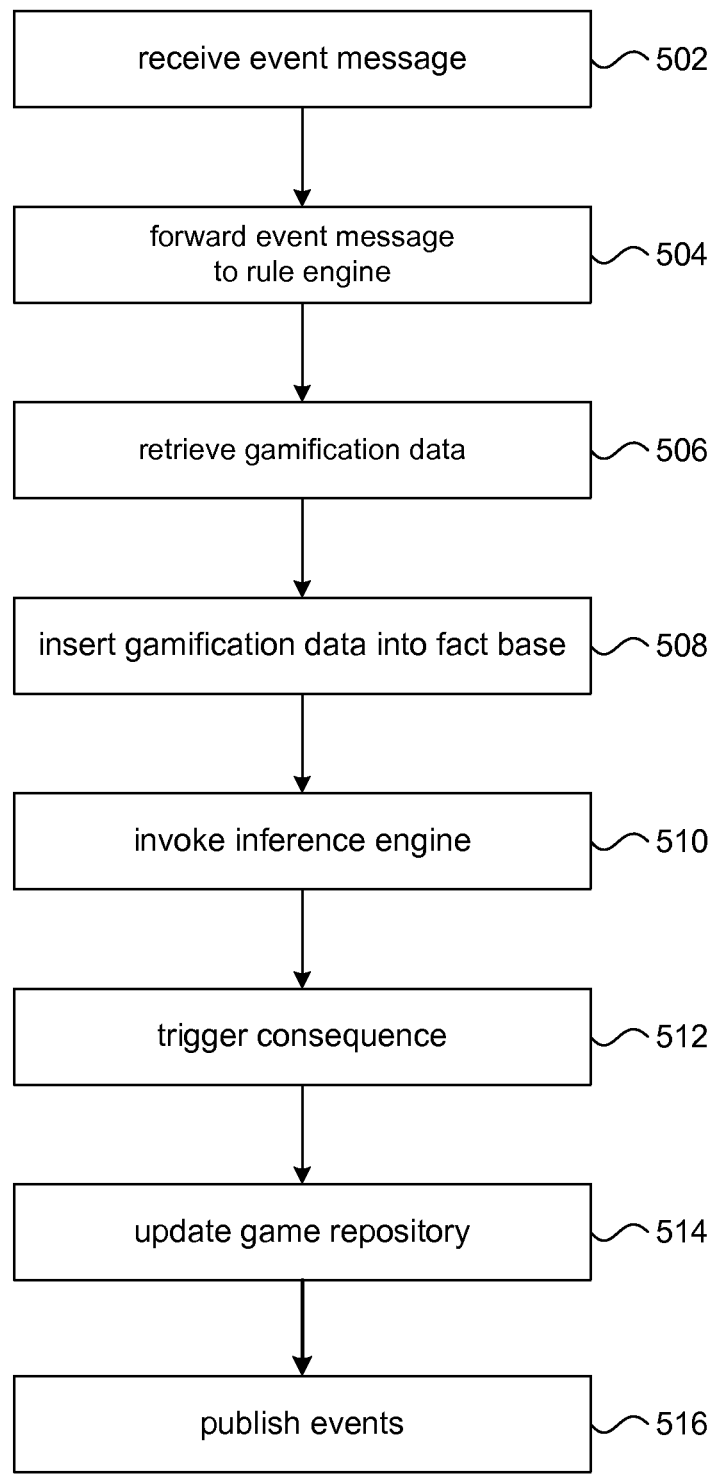
FIGS. 5 and 5A illustrate a runtime workflow in accordance with the present disclosure.
Figure 5A:
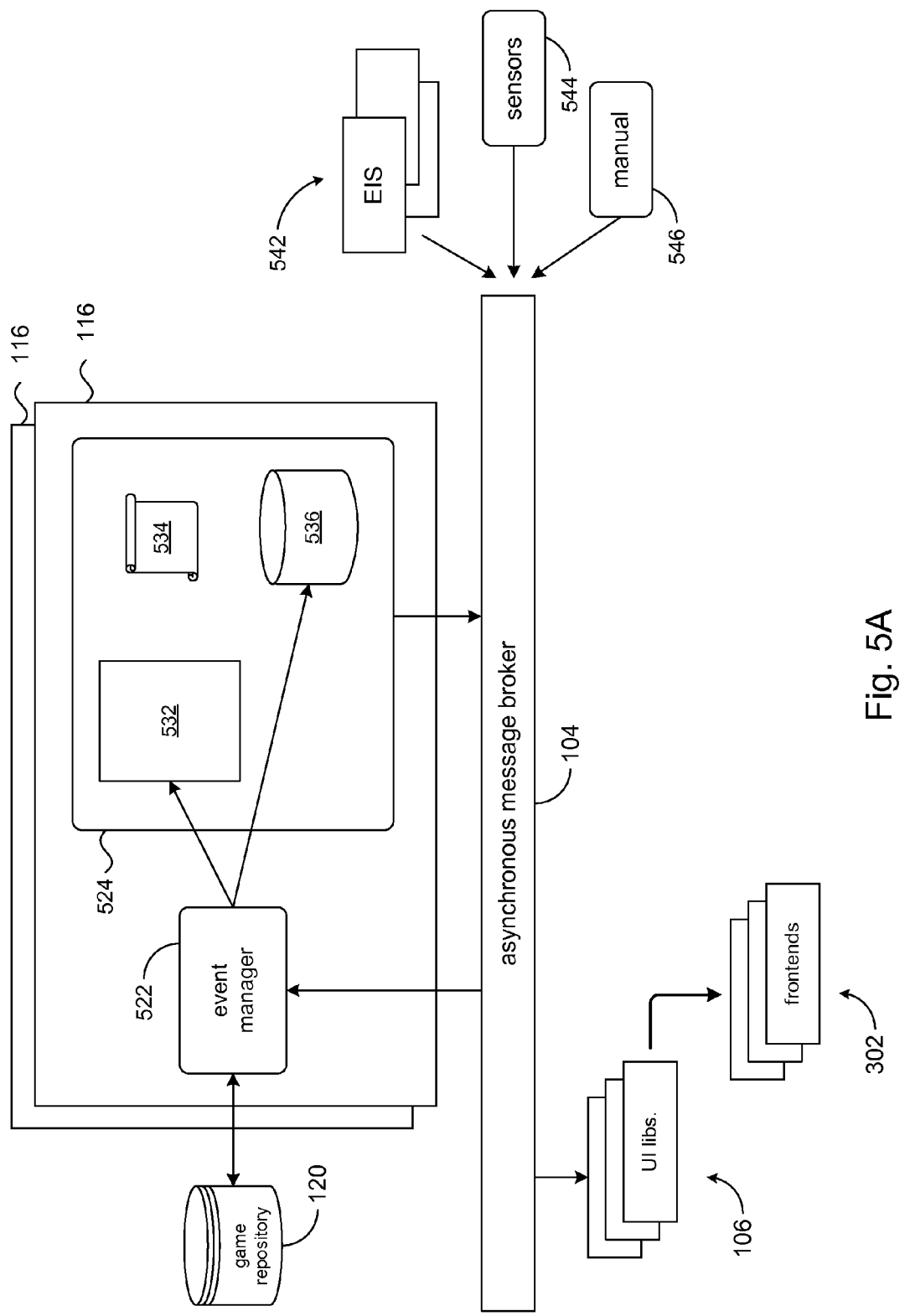

Referring to FIGS. 5 and 5A, an embodiment of the runtime workflow will be described. The runtime workflow highlights the processing that takes place when an event from the enterprise propagates into the gamification platform. The basic flow includes the message broker 104 receiving an event message from the enterprise information system(s) of the enterprise. The event message is forwarded to the rule engine 116, which processes the event message according to the gamification rules 22. As shown in FIG. 5A, the rule engine 116 may comprise an event manager 522 and a complex event processor 524. The complex event processor 524 may comprise an inference engine 532, a repository of rules 534, and a fact base 536.

Suppose an event $e_x$ in the enterprise occurs. For example, a business application 542 in the enterprise may detect the placement of a sales order, and in response may generate a SALES event message and communicate the event message to the message broker 104. In some embodiments, an event message may be generated by a sensor 544 or other automated device. For example, an event message may be sent when a sensor in a factory raises an alarm that machine x is broken; when a sensor informs that the airplane has taken off; when an alarm that a fire sprinkler in room #420 has been activated, and so on. In some embodiments, an event message may be generated manually 546. For example, the CEO of the enterprise decides to give all players 50 additional points; the last winner in an internal innovation contest receives a custom badge, and so on. In a step 502, the message broker 104 may receive the event message.

In a step 504, the message broker 104 may forward the event message to the rule engine 116. In a typical scenario, many players may be concurrently playing the game, and so the gamification system 100 is likely to be hit with many events as the players play the game and as events occur in the enterprise. Accordingly, in some embodiments, the gamification platform 102 may instantiate multiple rule engines 116 in order to accommodate high numbers of players in the enterprise and to process concurrent events coming in from the enterprise in order to provide adequate response time. For example, the message broker 104 may perform load balancing by distributing event messages across the multiple instantiations of rule engines 116. If a rule engine 116 is not available to process the event message, the message broker 104 may store the event message until a rule engine becomes available.

When the message broker 104 forwards the event message to a rule engine 116, the event message may be received by the event manager 522. In a step 506, the event manager 522 may retrieve gamification data from the gamification repository 120 based on data contained in the received event message. In accordance with the present disclosure, the current state of the game and the current state of its players may be incorporated in the gamification rules 22, in addition to events. Accordingly, the event manager 522 may access gamification data including state information about the player or players involved the event, the gamification state, and other information relevant to processing an event in terms of the current state (context) of the game. For example, relevant contextual information about the game or player may be that it is currently night time in the game, that three of the ten hidden treasures have been discovered, that player X is nearby, that player Y has 100 experience points, and so on. As will be discussed, the inference engine 532 may reason through the gamification rules 22 using such contextual information.

In a step 508, the event manager 522 may provide the retrieved gamification data to the complex event processor 524. In particular, the received event message and the retrieved gamification data may be loaded into the fact base 536 of the complex event processor 524. The gamification data may serve to initialize the fact base 536 with information (i.e., context) relating to the current state of the game that is relevant to the received event message.

In a step 510, event manager 522 may invoke processing in the inference engine 532 to reason if the received event message fulfills any of the gamification rules 22 using the received event message and the context loaded into the fact base 536. As explained above, the RMS 112 may store and manage several versions of gamification rules 22. Accordingly, the gamification rules 22 that are in play may be stored in the repository of rules 534 and accessed by the inference engine 532.

In accordance with principles of the present disclosure, the inference engine 532 may reason over multiple events and arbitrary relationships among events. The inference engine 532 may also take into account the current gamification state and previous gamification states. The inference engine 532 may reason over events related by logic, time, and space. For example, if event A occurred within 5 minutes of event B, then inference engine 532 may trigger a certain consequence. If event A occurred at location X, then trigger a consequence, but if event A occurred at location Y, then trigger another consequence. If event A occurred when player X has 100 experience points, then trigger a consequence. If event A and event B occur within 10 days of each other, and in respective locations X and Y, then trigger an event. If event A occurred when it is night time in the game, then trigger a consequence. And so on.

In a step 512, if a gamification rule is satisfied, then the inference engine 532 may trigger a consequence associated with the gamification rule, for example rewarding a player who made an achievement. However, it will be appreciated that consequences may involve any arbitrary action. A commerce type event may result in debiting a players virtual bank account when they purchase an item, for example. If a player uses a "cheat", the player may be punished by a reduction in their experience points as a consequence. The inference engine 532 may generate one or more progress event messages to represent the consequence(s) triggered by a gamification rule.

In accordance with principles of the present disclosure, a gamification rule need not lead to a consequence with actions that immediately change the gamification state. For example, the consequence of a gamification rule may be to invoke another gamification rule. Consider, for example, a delayed award. Suppose a player performs a task X. The gamification rule for performing task X may be to invoke a time delay rule that waits for some amount of time to pass, say 24 hours. The time delay rule may then give the player their award when the 24 hours has passed. More generally, gamification rules may be nested, which is to say that one gamification rule, when triggered, may invoke another gamification rule, which in turn may invoke yet another gamification rule when triggered, and so on. The nesting of gamification rules allows a designer to specify a series of nested sub-goals that a player or players may have to achieve in order to win a prize.

In a step 514, the gamification repository 120 may be updated by the inference engine 532 to maintain a current gamification state, for example by publishing the progress events generated in step 512 into the message broker 104. The current gamification state (context) may be represented with state information about the game environment. For example, gamification state information may include state information that indicates time of day, season (summer, fall, etc.), current weather (raining, windy, etc.), and so on. The gamification state information may include state information about the state of structures in the game. For example, a building is on fire, a forest has X number of trees, a road has been traversed. The gamification state information may include state information about the state of items in the game; e.g., five treasures have been discovered by players, a door is open, a car is being driven, and so on. The gamification state information may include state information about the players in the game; e.g., their current location, game level, experience points, health, their possessions, achievements, and so on.

In a step 516, the progress event messages may be published to the message broker 104 and to be forwarded to players in the enterprise. In some embodiments, the players may register to receive certain progress events. For example, a sales person player may not be interested in progress events relating to implementation of an employee safety program by the human resource group. The sales person player may therefore designate to receive only progress events that relate to sales. Accordingly, the message broker 104 may perform some degree of filtering and distribution control to forward relevant progress events to each player according to the player's preferences. In addition, the player may simply turn off gamification, in which case the message broker 104 filters out all messages for that player. In some embodiments, the player may introduce an avatar to protect their identity. Accordingly, message passing by the message broker 104 may be influenced by the fact that the player has defined an avatar to represent them.

Figure 6:
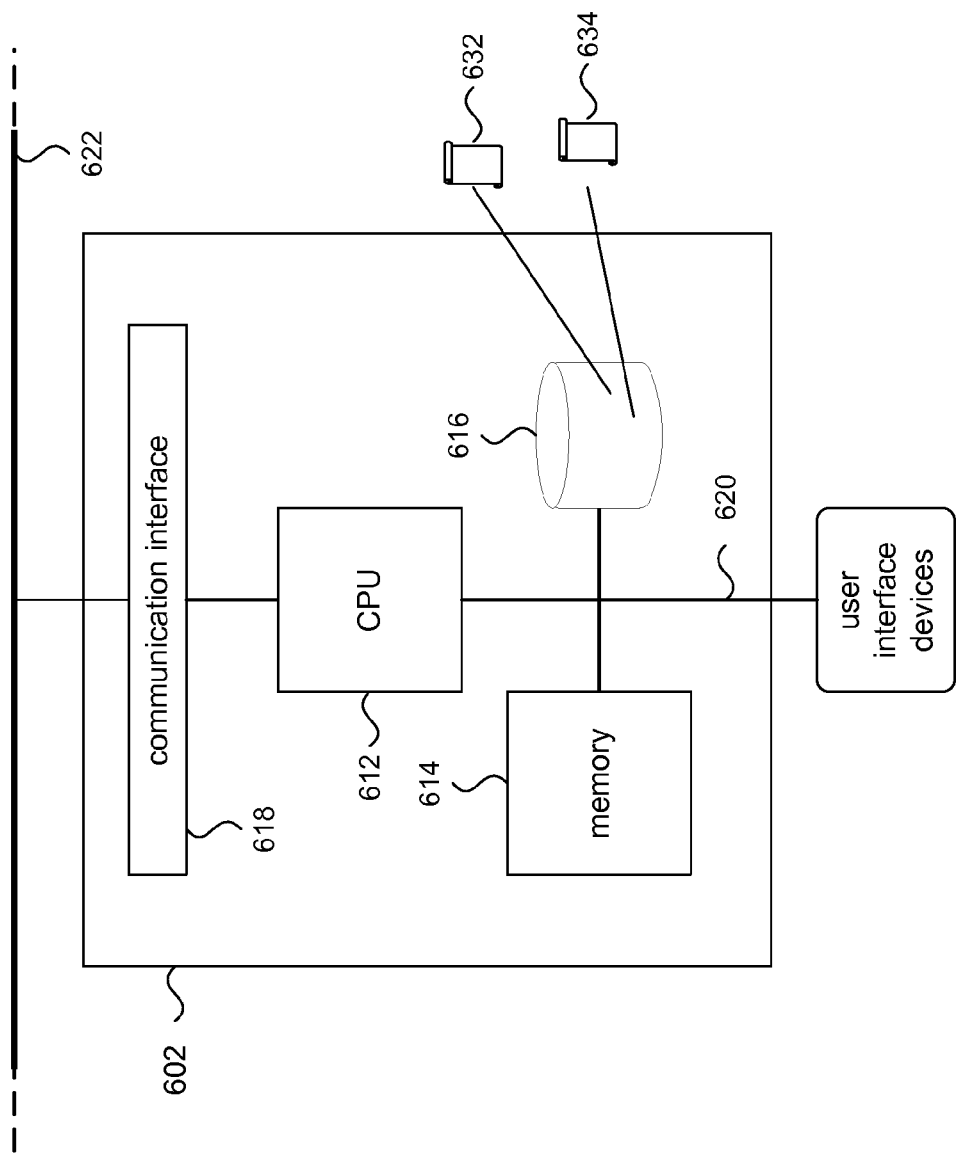
FIG. 6. shows a high level diagram of an illustrative implementation of a gamification system of the present disclosure.

A particular embodiment of the gamification platform 102 in accordance with the present disclosure is illustrated in FIG. 6, which shows a high level block diagram of a computer system 602 configured to operate as the gamification platform. The computer system 602 may include a central processing unit (CPU) or other similar data processing component. The computer system 602 may include various memory components. For example, the memory components may include a volatile memory 614 (e.g., random access memory, RAM) and a data storage device 616. A communication interface 618 may be provided to allow the computer system 602 to communicate over a communication network 622, such as a local area network (LAN), the Internet, and so on. An internal bus 620 may interconnect the components comprising the computer system 602.

The data storage device 616 may comprise a non-transitory computer readable medium having stored thereon computer executable program code 632. The computer executable program code 632 may be executed by the CPU 612 to cause the CPU to provide the processing of the rule engine 116. For example, the CPU may perform the workflows shown in FIGS. 3 and 4. In some embodiments, the computer system 602 and computer executable program code 632 may provide virtualization capability to facilitate supporting multiple instances of the rule engine 116.

The data storage device 616 may store data structures 634 such as the gamification rules 22, and may serve as the gamification repository 120. In some embodiments, the data storage device 616 may comprise a separate storage system to serve as the gamification repository 120.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

ADVANTAGES AND TECHNICAL EFFECT

A gamification system in accordance with principles of the present disclosure provides a platform to gamify an enterprise by facilitating the integration of the enterprise's enterprise information system(s) with a gamification platform. The gamification system can provide immediate feedback to the enterprise users/players via progress events. The gaming environment provides a context that can present the enterprise's goals and challenges in an engaging and "fun" manner that encourages participation by the users. The gamification system can provide ranks/levels, time pressures, team building, virtual goods, gifts, marketplaces, and encourage competition among players. Additional game mechanics includes rewarding of points (such as experience points, redeemable points, etc.), managing a leader board, and so on.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

APPENDIX—Gamification Rules Example

```
package example
global IAchievementUpdateAPI updateAPl;
global IAdminAPI adminApi;
declare EventObject
   @role(event)
   @timestamp(dateTime)
   @duration(eventDuration)
end
################New User Rules ##########################################
rule "newUser"
  when
     $evt : EventObject(type=="new_user") from entry-point eventstream
  then
     performance.debug(System.nanoTime()+";SEND;"+$evt.getType()+";"+$evt.getId()+";"+
$evt.getEventObject()+";"+$evt.getPlayerid());
     adminApi.createPlayer($evt.getPlayerid(), $evt.getId()); retract($evt);
end
rule "removeUser"
  when
     $p : Player($playerid:uid)
     $evt : EventObject(type=="delete_user", playerid==$playerid) from entry-point eventstream
  then
     adminApi.deletePlayer($playerid); retract($evt);
end
rule "cleanMemoryOnUserRemoval"
  when
     $p : Player($playerid:uid)
     $del_evt : EventObject(type=='delete_user', playerid==$playerid) from entry-point eventstream
     $evt : EventObject(playerid==$playerid) from entry-point eventstream
  then
     adminApi.deletePlayer($evt.getPlayerid());
     retract($evt); retract($del_evt); retract($p);
end
rule "newRideintent"
  when
     Player($playerid : uid)
     $evt : EventObject(type=='new_rideintent', playerid==$playerid, eventDuration==0) from entry-point event-
stream
  then
     EventObject obj = new EventObject();
     obj.setType("delayed_rideintent");
     obj.setEventDuration(10*1000);
     obj.setPlayerid($playerid);
     obj.put("mrid", $evt.get("mrid"));
     retract($evt);
     entryPoints["internalstream"].insert(obj);
end
rule "deleteRideIntent"
  when
     $p : Player($playerid : uid)
     $ri : EventObject(type=='delayed_rideintent', playerid==$playerid) from entry-point internalstream
     $ri_delete : EventObject(type=='delete_rideintent', playerid==$playerid, data['mrid']==$ri.data['mrid'], this dur-
ing
$ri) from entry-point eventstream
    then
        retract($ri);
        retract($ri_delete);
end
rule "RIAfterDuration"
   timer(expr:$duration;)
   when
     $p : Player($playerid:uid)
     $ri : EventObject(type=='delayed_rideintent', $duration: eventDuration, playerid==$playerid) from entry-point
internalstream
   then
     retract($ri);
     EventObject obj = new EventObject();
     obj.setType("pointEvent");
```

APPENDIX—Gamification Rules Example

```
        obj.setPlayerid($playerid);
        updateAPI.givePoints($p.getId(), "Point", 1, obj.getId());
end
rule "RIAfterRide"
    when
        $p : Player($playerid:uid)
        $ri : EventObject(type=='delayed_rideintent', playerid==$playerid) from entry-point internalstream
        $ar : EventObject(type=='actual_ride', playerid==$playerid, data['mrid']==$ri.data['mrid']) from entry-point internalstream
    then
        EventObject obj = new EventObject();
        obj.setType("pointEvent");
        obj.setPlayerid($playerid);
        updateAPI.givePoints($p.getId(), 'Point', 1, obj.getId());
        retract($ri);
end
######################Ride Rules #############################
rule "RewardRideAsDriver"
    when
        $p : Player($playerid:uid)
        $ar : EventObject(type=='actual_ride', data['driver']=='true',$carbon:data['carbon'], playerid==$playerid, $rideid:data['rideid']) from entry-point eventstream
    then
        EventObject evt = new EventObject();
        evt.setType("pointEvent");
        evt.setPlayerid($playerid);
        updateAPI.givePoints($p.getId(), "Point", 5, evt.getId());
        evt = new EventObject();
        evt.setType("pointEvent");
        evt.setPlayerid($playerid);
        updateAPI.givePoints($p.getId(), "Carbon", Double.parseDouble($carbon), evt.getId());
        EventObject obj = new EventObject();
        obj.setType('rideEvent');
        obj.setPlayerid($playerid);
        obj.put('rideid', $rideid);
        entryPoints['internalstream'].insert(obj);
        retract($ar);
end
rule "RewardRideAsPassenger"
    when
        $p : Player($playerid:uid)
        $ar : EventObject(type=='actual_ride', data['driver']=='false', $carbon:data['carbon'],playerid==$playerid,$rideid:data['rideid']) from entry-point eventstream
    then
        EventObject evt = new EventObject();
        evt.setType("pointEvent");
        evt.setPlayerid($playerid);
        updateAPI.givePoints($p.getId(), "Point", 3, evt.getId());
        evt = new EventObject();
        evt.setType("pointEvent");
        evt.setPlayerid($playerid);
        updateAPI.givePoints($p.getId(), "Carbon", Double.parseDouble($carbon), evt.getId());
        EventObject obj = new EventObject();
        obj.setType('rideEvent');
        obj.setPlayerid($playerid);
        obj.put('rideid', $rideid);
        entryPoints['internalstream'].insert(obj);
        retract($ar);
end
rule "RideMatch"
    when
        $evt1:EventObject(type=='rideEvent', $rideid:data['rideid'], $playerid:playerid) from entry-point internalstream
        $evt2:EventObject(type=='rideEvent', data['rideid']==$rideid, playerid!=$playerid, $playerid2:playerid) from entry-point internalstream
        not(EventObject(type=='socializerEvent', playerid==$playerid, data['friendid'[==$playerid2) from entry-point internalstream)
    then
        EventObject evt = new EventObject();
        evt.setType('socializerEvent');
        evt.setPlayerid($evt1.getPlayerid());
        evt.put('friendid', $evt2.getPlayerid());
        entryPoints['internalstream'].insert(evt);
end
rule "Contacts+1"
    when
        $p : Player($playerid:uid)
        $evt : EventObject(type=='socializerEvent', playerid==$playerid, $friendid:data['friendid']) from entry-point
```

-continued

APPENDIX—Gamification Rules Example

```
internalstream
    then
        EventObject evt = new EventObject();
        evt.setType("pointEvent");
        evt.setPlayerid($playerid);
        updateAPI.givePoints($p.getId(), "Contact", 1, evt.getId());
end
rule "WarriorBadge"
    when
        Player($playerid : uid)
        Number(intValue==3) from accumulate($evt : EventObject(type=='new_rideintent', playerid==$playerid) over window:time(10s) from entry-point eventstream, count($evt))
    then
        updateAPI.addBadgeToPlayer($playerid, "Warrior Badge");
end
```

What is claimed is:

1. A computer-implemented method comprising:
  causing a context engine comprising an in-memory database engine to collect data from a first source comprising a first gamification platform regarding a first event comprising an action taken in an enterprise by an actor;
  causing the context engine to collect first context data over an asynchronous message broker from a second source comprising a machine-to-machine stack including a hygroscopic sensor from a wearable of the actor;
  causing the context engine to collect second context data over the asynchronous message broker from a third source comprising a second gamification platform regarding a second event involving the actor;
  causing the context engine to perform a first aggregation of the first context data from the second source, and then to perform a second aggregation to process the data and aggregated first context data to create context enriched data by calculating a defined trust metric from the data and the second context data;
  causing the context engine to store the context enriched data in an in-memory database;
  causing the context engine to provide the context enriched data in a view within the in-memory database;
  determining from the context enriched data that the actor has achieved a predetermined goal;
  based upon achievement of the predetermined goal, triggering the asynchronous message broker to communicate a message to assign an additional role to the actor.

2. The method of claim 1 further comprising causing the context engine to send the context enriched data to the first gamification platform.

3. The method of claim 1 further comprising:
  causing the context engine to collect third context data,
  wherein the context engine processes the third context data with the data and the first context data to create the context enriched data, and
  wherein the third context data is sent from an external system comprising a location based service.

4. The method of claim 1 wherein the second source comprises a social network, business process, tool, or communication system.

5. The method of claim 1 wherein the context engine processes the data and the first context data by filtering.

6. The method of claim 1 wherein the view comprises a location-based view, and the context engine processes the data and the first context data according to the defined trust metric.

7. A non-transitory computer readable storage medium embodying a computer program for performing a method, said method comprising:
  causing a context engine comprising an in-memory database engine to collect data from a first source comprising a gamification platform regarding a first event comprising an action taken in an enterprise by an actor;
  causing the context engine to collect first context data over an asynchronous message broker from a second source comprising a machine-to-machine stack including a hygroscopic sensor from a wearable of the actor;
  causing the context engine to collect second context data over the asynchronous message broker from a third source comprising a second gamification platform regarding a second event involving the actor;
  causing the context engine to perform a first aggregation of the first context data from the second source, and then to perform a second aggregation to process the data and aggregated first context data to create context enriched data by calculating a defined trust metric from the data and the second context data;
  causing the context engine to store the context enriched data in an in-memory database;
  causing the context engine to provide the context enriched data in a view within the in-memory database;
  determining from the context enriched data that the actor has achieved a predetermined goal;
  based upon achievement of the predetermined goal, triggering the asynchronous message broker to communicate a message to assign an additional role to the actor.

8. The non-transitory computer readable storage medium of claim 7 further comprising causing the context engine to send the context enriched data to the first gamification platform.

9. The non-transitory computer readable storage medium of claim 7 wherein the method further comprises causing the context engine to collect third context data,
  wherein the context engine processes the third context data with the data and the first context data to create the context enriched data, and
  wherein the third context data is sent from an external system comprising a location based service.

10. The non-transitory computer readable storage medium of claim 7 wherein the second source comprises a social network, business process, tool, or communication system.

11. The non-transitory computer readable storage medium of claim 7 wherein the context engine processes the data and the first context data by filtering.

12. The non-transitory computer readable storage medium of claim 7 wherein the view comprises a location-based view, and the context engine processes the data and the first context data according to the defined trust metric.

13. A computer system comprising:
one or more processors;
a software program, executable on said computer system, the software program configured to:
cause a context engine comprising an in-memory database engine to collect data from a first source regarding a first event comprising an action taken in an enterprise by an actor;
cause the context engine to collect first context data over an asynchronous message broker from a second source comprising a machine-to-machine stack including a hygroscopic sensor from a wearable of the actor;
cause the context engine to collect second context data over the asynchronous message broker from a third source comprising a second gamification platform regarding a second event involving the actor;
cause the context engine to perform a first aggregation of the first context data from the second source, and then to perform a second aggregation to process the data and aggregated first context data to create context enriched data by calculating a defined trust metric from the data and the second context data;
cause the context engine to store the context enriched data in an in-memory database;
cause the context engine to provide the context enriched data in a view within the in-memory database;
determine from the context enriched data that the actor has achieved a predetermined goal;
based upon achievement of the predetermined goal, trigger the asynchronous message broker to communicate a message to assign an additional role to the actor.

14. The computer system of claim 13 wherein the context engine is further caused to send the context enriched data to the first gamification platform.

15. The computer system of claim 13 wherein the second source comprises a social network, business process, tool, or communication system.

16. The computer system of claim 13 wherein the software program is configured to further cause the context engine to collect third context data,
wherein the context engine processes the third context data with the data and the first context data to create context enriched data; and
wherein the third context data is sent from an external system comprising a location based service.

17. The computer system of claim 13 wherein the view comprises a location-based view, and the context engine processes the data and the first context data according to the defined trust metric.

* * * * *